(12) United States Patent
McMillan

(10) Patent No.: US 9,986,841 B2
(45) Date of Patent: Jun. 5, 2018

(54) ARMREST AND ARMREST PAD

(71) Applicant: Nigel William McMillan, Norfolk (GB)

(72) Inventor: Nigel William McMillan, Norfolk (GB)

( * ) Notice: Subject to any disclaimer, the term of this patent is extended or adjusted under 35 U.S.C. 154(b) by 223 days.

(21) Appl. No.: 14/892,532

(22) PCT Filed: May 20, 2014

(86) PCT No.: PCT/GB2014/051541
§ 371 (c)(1),
(2) Date: Nov. 19, 2015

(87) PCT Pub. No.: WO2014/188172
PCT Pub. Date: Nov. 27, 2014

(65) Prior Publication Data
US 2016/0088947 A1    Mar. 31, 2016

(30) Foreign Application Priority Data
May 20, 2013    (GB) .................................. 1309073.3

(51) Int. Cl.
*A47C 7/54*    (2006.01)
*A47C 11/00*   (2006.01)
*B60N 2/46*    (2006.01)

(52) U.S. Cl.
CPC .............. *A47C 7/54* (2013.01); *A47C 11/005* (2013.01); *B60N 2/46* (2013.01)

(58) Field of Classification Search
CPC ............ A47C 7/54; A47C 11/005; B60N 2/46
(Continued)

(56) References Cited

U.S. PATENT DOCUMENTS 2,541,756 A    2/1951 Goodman
5,924,769 A *  7/1999 Kao .................... A47C 7/54
                                            297/411.2
(Continued)

FOREIGN PATENT DOCUMENTS

EP    1445152 A1    8/2004
FR    2877615 A1    5/2006
(Continued)

OTHER PUBLICATIONS

International Search Report dated Jul. 3, 2014 from International Patent Application No. PCT/GB2014/051541 filed May 20, 2014.

*Primary Examiner* — Milton Nelson, Jr.
(74) *Attorney, Agent, or Firm* — Sunstone IP

(57) ABSTRACT

An armrest comprises a top surface; a first side surface and a second side surface being opposite to said first side surface; wherein said top surface incorporates a number of discrete regions; a first discrete region on which, in use, the elbow of a first user rests; said first discrete region extending diagonally towards said first side surface; and at least one further discrete region located in front of said first discrete region which extends diagonally towards said second side surface; whereby said second discrete region provides, in use, a resting surface for the elbow of a second user seating in an adjacent seat; wherein said first and said second regions are separated in the longitudinal direction by a line of separation which doesn't protrude higher than the majority of the top surface.

18 Claims, 24 Drawing Sheets

(58) Field of Classification Search
USPC .................................................... 297/411.2
See application file for complete search history.

(56) References Cited

U.S. PATENT DOCUMENTS

2003/0227208 A1* 12/2003 Burwell ............... A47C 1/03
  297/411.2
2007/0241235 A1   10/2007 Atchison

FOREIGN PATENT DOCUMENTS

| GB | 796613 A | 6/1958 |
| GB | 2455130 A | 6/2009 |
| WO | 2006051209 A2 | 5/2006 |

* cited by examiner

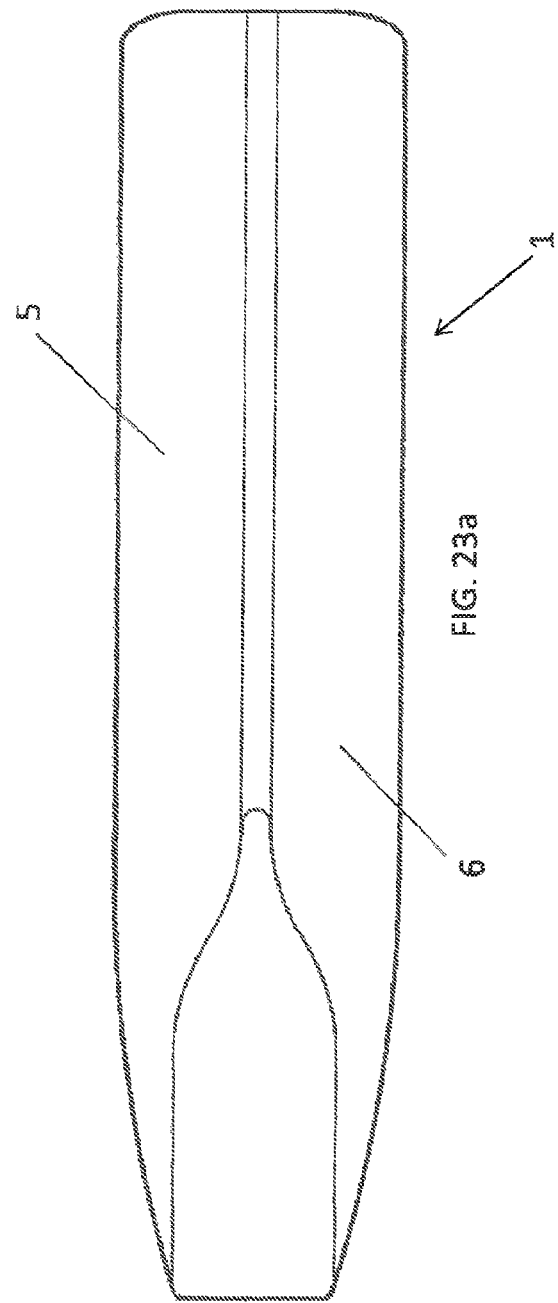
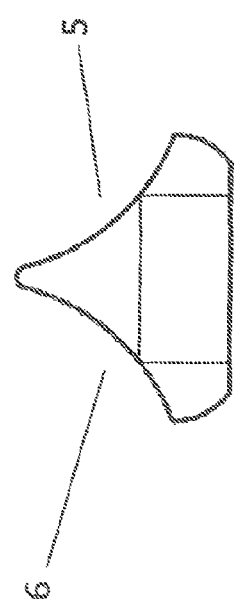
FIG. 23a
FIG. 23b

ARMREST AND ARMREST PAD

FIELD OF THE INVENTION

The invention relates to armrests and armrest pads for fitting onto armrests.

BACKGROUND TO THE INVENTION

The closest prior art known to the applicant are armrests used to serve adjacently positioned seats whereby individuals sitting in adjacent seats use the rest in such a way that both parties may conveniently rest their arms without interference with one another. Such a configuration is shown in U.S. Pat. No. 2,541,756 where a raised strip separates portions of an armrest for use by multiple users. This raised strip however discourages the use of the whole armrest by a single user, as the strip would prevent the user from comfortably placing their forearm over the whole of the armrest.

Another configuration exists in U.S. Pat. No. 7,959,231 where a dual plane armrest includes upper and lower forearm supports that overlap to permit respective use by neighbours. This configuration however does not fully solve the identified technical problem as it prevents the user utilising the lower support from naturally positioning their elbow on the armrest with their forearm raised. If this user wants to rest in this natural position they would have to utilise the upper support thereby negating the lower support and thereby not solving the technical problem. Moreover, neither height may be the optimum for the most comfortable arm resting position.

The current invention seeks to alleviate the above identified disadvantages.

SUMMARY OF THE INVENTION

In a first broad independent aspect the invention provides an armrest comprising a top surface; a first side surface and a second side surface being opposite to said first side surface; wherein said top surface incorporates a number of discrete regions; a first discrete region on which, in use, the elbow of a first user rests; said first discrete region extending diagonally towards said first side surface; and at least one further discrete region located in front of said first discrete region which extends diagonally towards said second side surface; whereby said second discrete region provides, in use, a resting surface for the elbow of a second user seating in an adjacent seat; wherein said first and said second regions are separated in the longitudinal direction by a line of separation which doesn't protrude higher than the majority of the top surface.

This configuration provides an armrest suitable for use by either one or two users where each user, sitting adjacently, has dearly defined regions in which to put their elbow or forearm. These regions are not separated by a protruding line or strip which would be uncomfortable for a single user using the whole of the armrest. The discrete regions are separated by a line of separation which doesn't protrude higher than the majority of the top surface, allowing two users to jointly rest on the armrest as well as allowing a single user to comfortably place their forearm across the whole armrest. Various embodiments of this invention may provide natural segregation whilst providing a safe structure which in an accident wouldn't cause any damage or risk of injury to a passenger or occupant interacting with the armrest. Furthermore various embodiments of the invention would also provide a particularly hardwearing structure as the first and second discrete regions may be provided as a single component.

In a second broad independent aspect, the invention provides an armrest comprising a top surface; a first side surface and a second side surface being opposite to said first side surface; wherein said top surface incorporates a number of discrete regions; a first discrete region on which, in use, the elbow of a first user rests; said first discrete region extending diagonally towards said first side surface; and at least one further discrete region located in front of said first discrete region which extends diagonally towards said second side surface; whereby said second discrete region provides, in use, a resting surface for the elbow of a second user seating in an adjacent seat; wherein both said first and second regions slope oppositely from one another down towards respective side surfaces. This configuration is particularly advantageous in terms of segregation whilst providing a top surface which is hardwearing and comfortable if used longitudinally and fully by a single user.

Preferably, said first region is bounded by a first diagonal line of separation located between said first and second region; and said second region is bounded by said first diagonal line of separation and a further diagonal line of separation extending in the opposite direction to said first line. This configuration creates a number of discrete regions where two users sitting in adjacent seats can intuitively place their elbow or forearm.

Preferably, said first discrete region slopes downward towards said first side surface. This configuration deters the use of a region, designed for the user positioned adjacent to the first side surface of the armrest, by the user sat adjacent to the second side surface of the armrest.

Preferably, said second discrete region slopes downward towards said second side surface. This configuration deters the use of a region, designed for the user sat adjacent to the second side surface of the armrest, by the user sat adjacent to the first side surface of the armrest.

Preferably, said first discrete region and said second side surface form an edge which incorporates an angle whilst said first discrete region and said first side surface form an edge which is rounded or relatively smooth or square. This configuration allows the discrete regions to be intuitive to the users sat either side of the armrest. It is more desirable for a user sat adjacent the first side surface to place their forearm in the discrete region which forms an edge which is rounded or relatively smooth or square at the first side surface than where the discrete region and second side surface form an edge which incorporates an angle.

Preferably, said second discrete region and said first side surface form an edge which incorporates an angle whilst said second discrete region and said second side surface form an edge which is rounded or relatively smooth. This configuration allows the discrete regions to be intuitive to the users sitting either side of the armrest. It is more desirable for a user sitting adjacent the second side surface to place their forearm in the discrete region which forms an edge which is rounded or relatively smooth at the second side surface than where the discrete region and first side surface form an edge which incorporates an angle.

Preferably, said first discrete region and said second side surface form an edge which incorporates an upward protrusion. The edge which incorporates an upward protrusion does not separate two discrete regions. This provides a configuration where it is counter intuitive for a user sat adjacent the second side surface to place their forearm in a discrete region where the discrete region and second side surface form an edge which incorporates an upward protrusion. This allows users on either side of the armrest to have dearly defined regions which are counter intuitive for the adjacent user to rest their arm on. Preferably, said second discrete region and said first side surface form an edge which incorporates an upward protrusion. The edge which incorporates an upward protrusion does not separate two discrete regions. This provides a configuration where it is counter intuitive for a user sitting adjacent the first side surface to place their forearm in a discrete region where the discrete region and first side surface form an edge which incorporates an upward protrusion. This allows users on either side of the armrest to have dearly defined regions which are counter intuitive for the adjacent user to rest their arm on.

Preferably, said discrete regions are concave. This configuration provides discrete regions on the armrest which support a user's forearm in a natural manner.

Preferably, said discrete regions are wedge shaped in cross-section. This configuration also provides an intuitive structure whereby user's sitting either side of the armrest can intuitively place their forearms. This configuration also provides support to a single user utilising the whole of the armrest as between each wedge shape there may be a flat surface which can support the single user's forearm.

Preferably, said discrete regions are separated by a trough. This configuration prevents a protrusion along the top surface of the armrest which would be uncomfortable for a single user utilising the whole of the armrest. Alternatively, the discrete regions are separated by a flat surface.

In a further broad independent aspect, the invention provides an armrest pad comprising a top surface; a first side surface, a second side surface and a bottom surface for securing onto the top surface of an armrest; said second side surface being opposite to said first side surface; wherein said pad's top surface incorporates a number of discrete regions; a first discrete region on which, in use, the elbow of a first user rests; said first discrete region extending diagonally towards said first side surface; and at least one further discrete region located in front of said first discrete region which extends diagonally towards said second side surface; whereby said second discrete region provides, in use, a resting surface for the elbow of a second user seating in an adjacent seat; wherein said first and said second regions are separated in the longitudinal direction by a line of separation which doesn't protrude higher than the majority of the top surface.

Preferably, said first and second surfaces slope oppositely from one another down towards respective side surfaces.

This configuration provides an armrest pad for securing onto the top surface of an armrest, that is suitable for use by either one or two users where each user, sitting adjacently, has clearly defined regions in which to put their elbows or forearms. These regions are not separated by a protruding line or strip which would be uncomfortable for a single user using the whole of the armrest pad. The discrete regions are separated by a line of separation which doesn't protrude higher than the majority of the top surface, allowing two users to jointly rest on the armrest pad as well as allowing a single user to comfortably place their forearm across the whole armrest pad. This configuration is also particularly advantageous in terms of segregation whilst providing a top surface which is hardwearing and comfortable if used longitudinally and fully by a single user.

Preferably, said first region is bounded by a first diagonal line of separation located between said first and second region; and said second region is bounded by said first diagonal line of separation and a further diagonal line of separation extending in the opposite direction to said first line. This configuration creates a number of discrete regions where two users sitting in adjacent seats can intuitively place their elbows or forearms on the pad.

Preferably, said first discrete region slopes downward towards said first side surface. This configuration deters the use of a region, designed for the user positioned adjacent to the first side surface of the pad, by the user sitting adjacent to the second side surface of the pad.

Preferably, said second discrete region slopes downward towards said second side surface. This configuration deters the use of a region, designed for the user sat adjacent to the second side surface of the pad, by the user sitting adjacent to the first side surface of the pad.

Preferably, said first discrete region and said second side surface form an edge which incorporates an angle whilst said first discrete region and said first side surface form an edge which is rounded or relatively smooth or square. This configuration allows the discrete regions to be intuitive to the users sat either side of the pad. It is more desirable for a user sitting adjacent the first side surface to place their forearm in the discrete region which forms an edge which is rounded or relatively smooth or square at the first side surface than where the discrete region and second side surface form an edge which incorporates an angle.

Preferably, said second discrete region and said first side surface form an edge which incorporates an angle whilst said second discrete region and said second side surface form an edge which is rounded or relatively smooth or square. This configuration allows the discrete regions to be intuitive to the users sat either side of the pad. It is more desirable for a user sitting adjacent the second side surface to place their forearm in the discrete region which forms an edge which is rounded or relatively smooth or square at the second side surface than where the discrete region and first side surface form an edge which incorporates an angle.

Preferably, said first discrete region and said second side surface form an edge which incorporates an upward protrusion. The edge which incorporates an upward protrusion does not separate two discrete regions. This provides a configuration where it is counter intuitive for a user sitting adjacent the second side surface to place their forearm in a discrete region where the discrete region and second side surface form and edge which incorporates an upward protrusion. This allows users on either side of the pad to have clearly defined regions which are counter intuitive for the adjacent user to rest their arm on.

Preferably, said second discrete region and said first side surface form an edge which incorporates an upward protrusion. The edge which incorporates an upward protrusion does not separate two discrete regions. This provides a configuration where it is counter intuitive for a user sitting adjacent the first side surface to place their forearm in a discrete region where the discrete region and first side surface form an edge which incorporates an upward protrusion. This allows users on either side of the pad to have clearly defined regions which are counter intuitive for the adjacent user to rest their arm on.

Preferably, said discrete regions are concave. This configuration provides discrete regions on the pad which support a user's forearm in a natural manner.

Preferably, said discrete regions are wedge shaped in cross-section. This configuration also provides an intuitive structure whereby users sitting either side of the pad can intuitively place their forearms. This configuration also provides support to a single user utilising the whole of the pad as each wedge shape will cradle the single user's forearm in a similar manner to the concave discrete regions when two users are utilising the pad.

Preferably, said discrete regions are separated by a trough. This configuration separates the discrete region without a protrusion along the top surface of the pad, which would be uncomfortable for a single user utilising the whole of the pad. Alternatively the discrete regions are separated by a flat surface.

In another broad independent aspect, the invention provides an armrest comprising a top surface; a first side surface and a second side surface being opposite to said first side surface; wherein said armrest incorporates a number of discrete regions which are recessed from said top surface; each recessed discrete region having a base surface which is lower than the height of said top surface of the armrest and a side wall which slopes downwards from said top surface to said base surface; wherein a first recessed discrete region has an opening at said first side surface, and a second recessed discrete region has an opening at said second side surface; wherein one of said recessed discrete regions is positioned in front of the other to form a staggered configuration which, in use, allows the forearm or elbow of adjacent users to rest.

BRIEF DESCRIPTION OF THE FIGURES

FIG. 23a shows a plan view of yet another embodiment of the invention.

FIG. 23b shows a cross-sectional view of the embodiment of FIG. 23a.

DETAILED DESCRIPTION OF THE FIGURES

The invention concerns armrests located on aircraft and other commercial vehicles and also in public locations such as theatres and halls. However, the invention is not limited to the above locations and may be employed wherever an armrest, or armrest pad, is required, for any chair or configuration of that kind.

Figure 1:
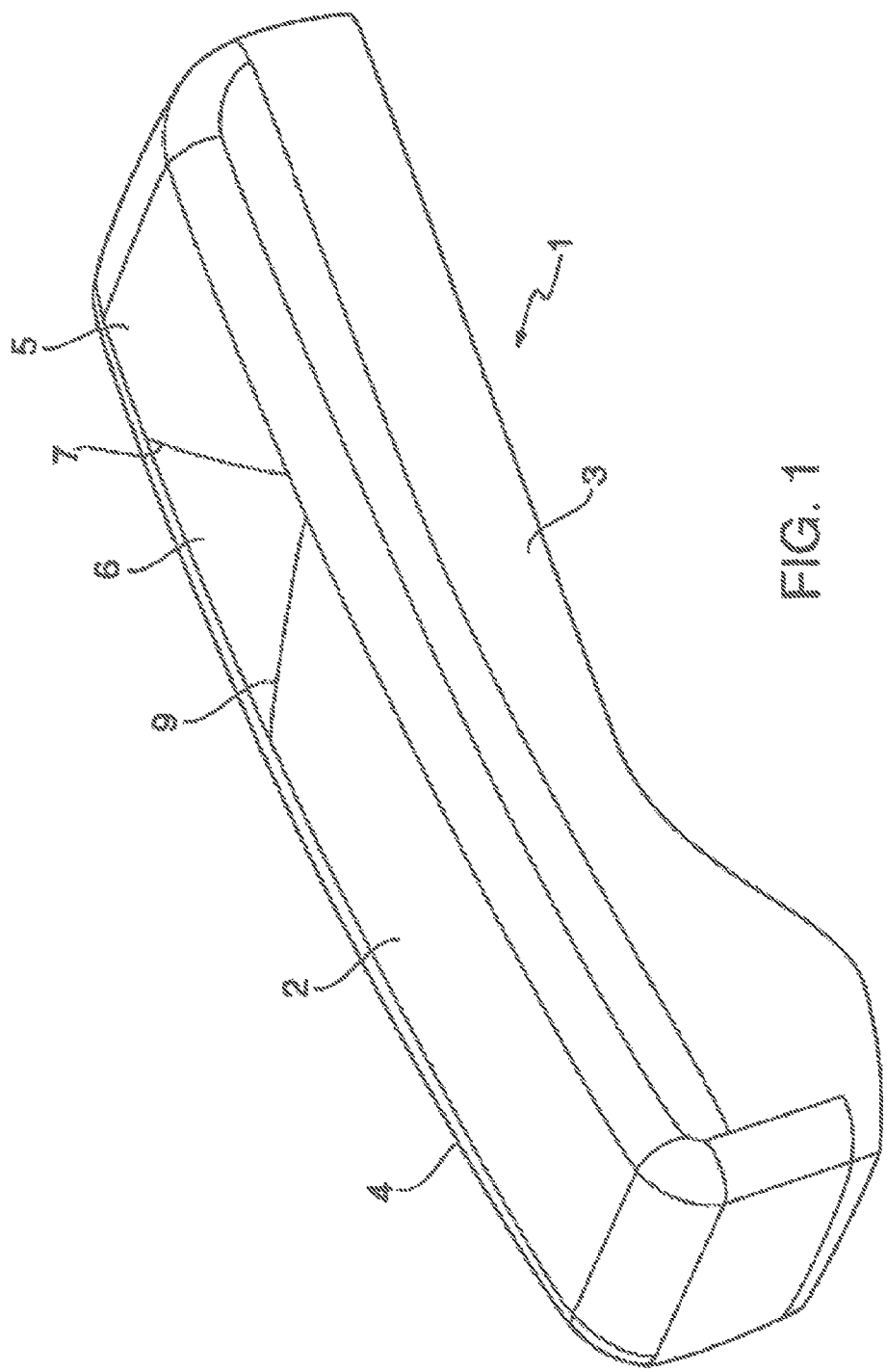
FIG. 1 shows an armrest incorporating two discrete regions.

FIG. 1 shows an armrest indicated by 1, which incorporates a top surface 2, a first side surface 3, and a second side surface 4. The top side surface 2 incorporates a number of discrete regions 5 and 6. In use, the elbow of a first user rests on the first discrete region 5 and the elbow of an adjacently sitting second user rests on the second discrete region 6. The first discrete region 5 extends diagonally towards the first side surface 3 and the second discrete region 6 extends diagonally towards the second side surface 4. The first and second discrete regions, 5 and 6, are separated by a line of separation 7. This line of separation 7 does not protrude higher than the majority of the top surface 2. Preferably, each of the discrete regions, 5 and 6, slopes downwards towards their respective user.

This configuration allows comfortable use of an armrest 1 between two users. The configuration also allows a single user to comfortably use the whole armrest 1 when sharing of the armrest 1 with a second user is not required. The first discrete region of the armrest has in effect a 'mirrored' version (the second discrete region) for use on the opposite side of the seat, at a staggered location.

The first discrete region 5 of the armrest 1 is bounded by a first diagonal line of separation 7, which is located between the first and second discrete regions, 5 and 6. The second discrete region 6 of the armrest 1 is bounded by the first diagonal line of separation 7 and a further second diagonal line of separation 9. The second diagonal line of separation 9 extends in the opposite direction to the first 7. It is recognised that the angles of the diagonal lines of separation may vary to optimise comfort to users either side of the armrest. Areas between the discrete regions, such as 5 and 6, may be substantially flat, providing conventional armrest support for a single user.

In an alternative embodiment the discrete regions 5 and 6 of the armrest 1 are also concave to provide a natural resting position for each user's elbow or forearm.

The armrest 1 consists substantially of plastics material. However, it is also recognised that the armrest may contain materials such as metal, or other materials well known in the art.

Figure 14:
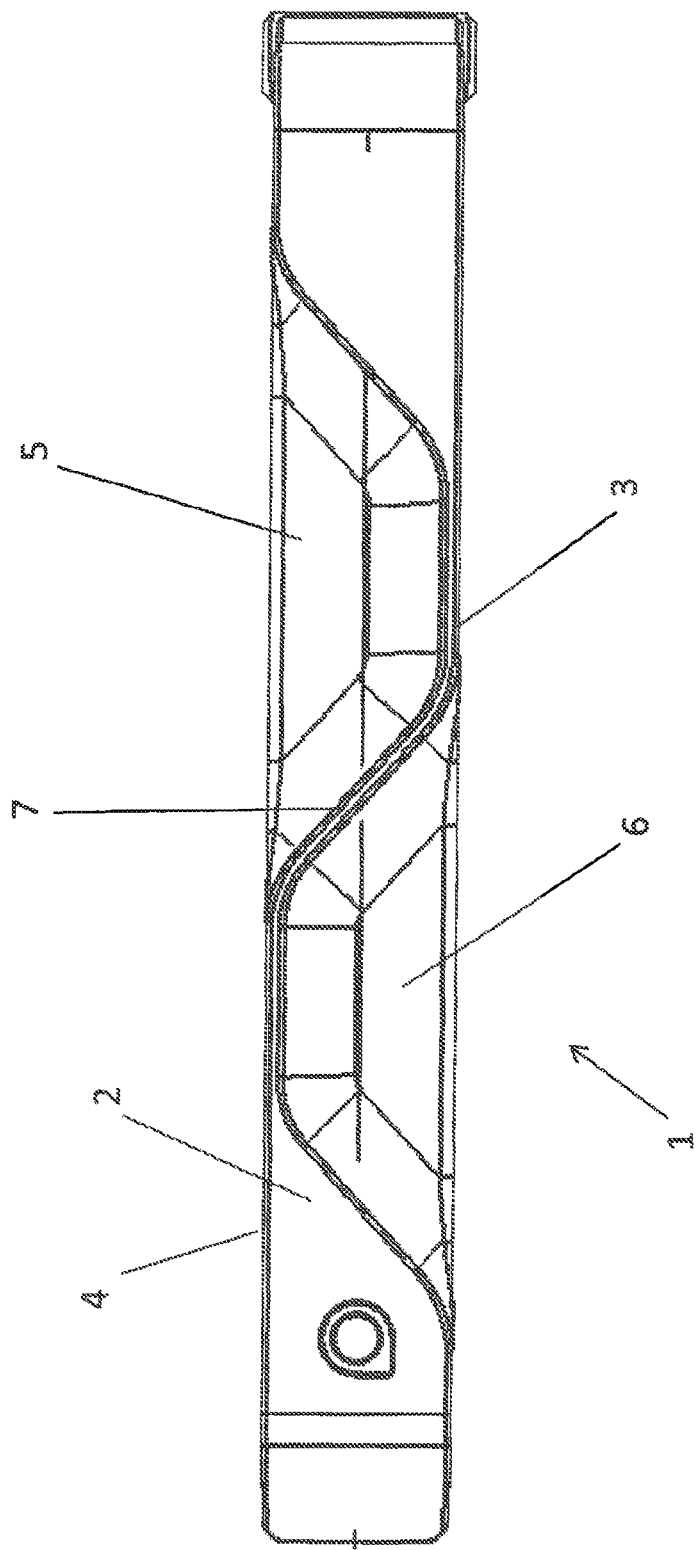
FIG. 14 shows a plan view of an armrest in accordance with a further embodiment of the invention.

A preferred embodiment is shown in FIG. 14, which shows an armrest 1 having two discrete regions 5 and 6, separated by several lines of separations 7 forming a separation region. In this preferred embodiment, line of separation 7 runs along the armrest and creates the distinct regions 5, 6. The discrete regions 5 and 6 are of a lower height than the top surface 2 of the armrest 1, and preferably slope downwards towards their respective side walls 3, 4. The separation region is co-planar with the majority of the top surface. This provides a configuration in which adjacent users can intuitively place their forearms and/or elbows into the discrete regions, thereby providing each user with their own personal space on the armrest 1. The distal front portion of the armrest also slopes downwards.

Figure 15:
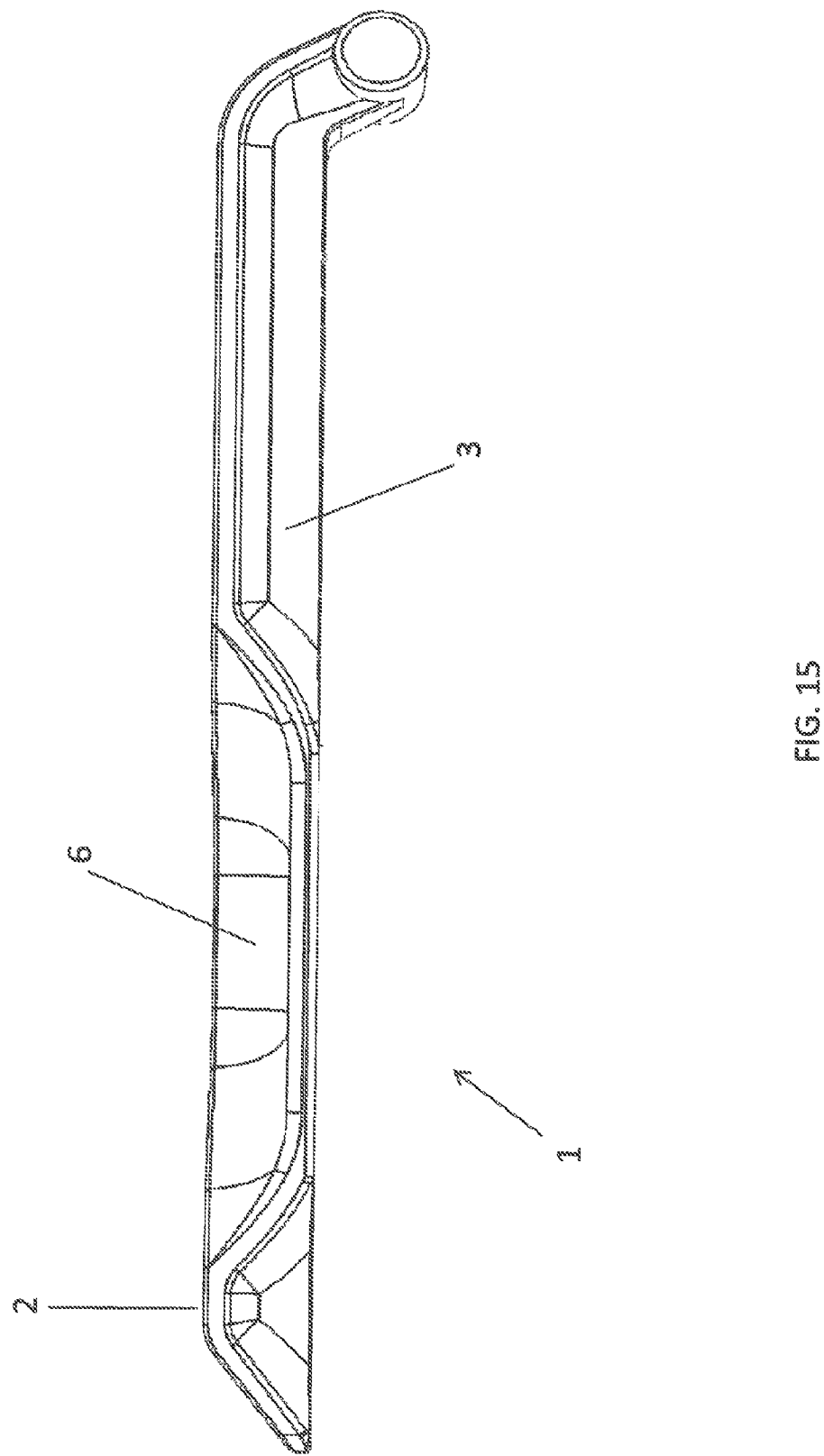
FIG. 15 shows a view from the side of the embodiment shown in FIG. 14.

FIG. 15 shows a side view of this preferred embodiment, which illustrates the configuration of the distinct regions, in particular distinct region 6 which slopes downwards from the top surface 2 towards the side wall 3 and has a concave configuration. The junction between the side wall of the distinct region and the base of the distinct region is radiused.

Figure 2:
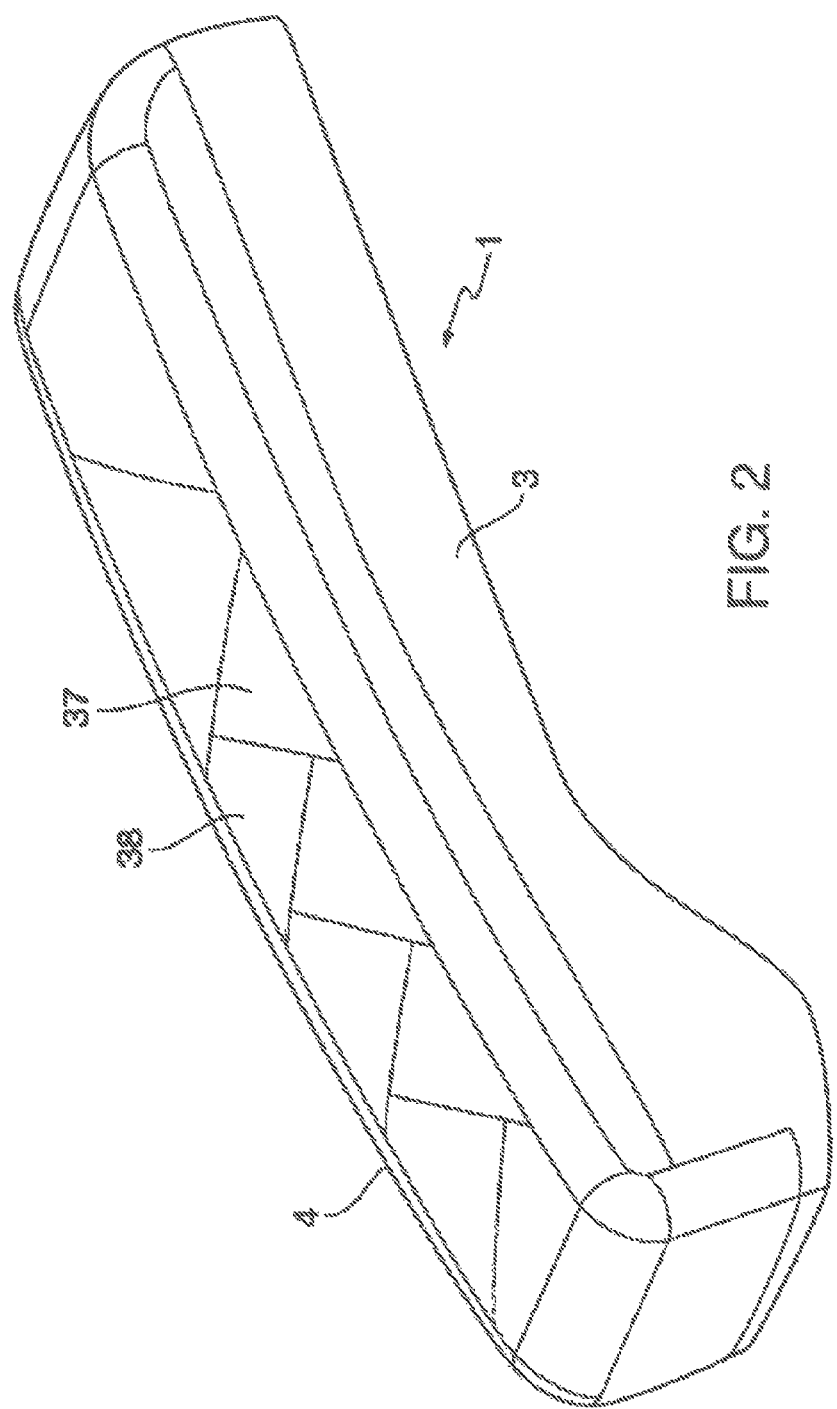
FIG. 2 shows an armrest with more than two discrete regions.

FIG. 2 shows an alternative embodiment of the invention, where an armrest 1 incorporates more than two discrete regions, such as 37 and 38. Incorporating more than two discrete regions allows users located either side of the armrest 1 to have multiple resting positions along the armrest 1. Each one of the respective discrete regions may be sloped towards one of the side surfaces—thus optionally forming a succession of oppositely sloping regions which may serve as advantageous resting surfaces.

Figure 3:
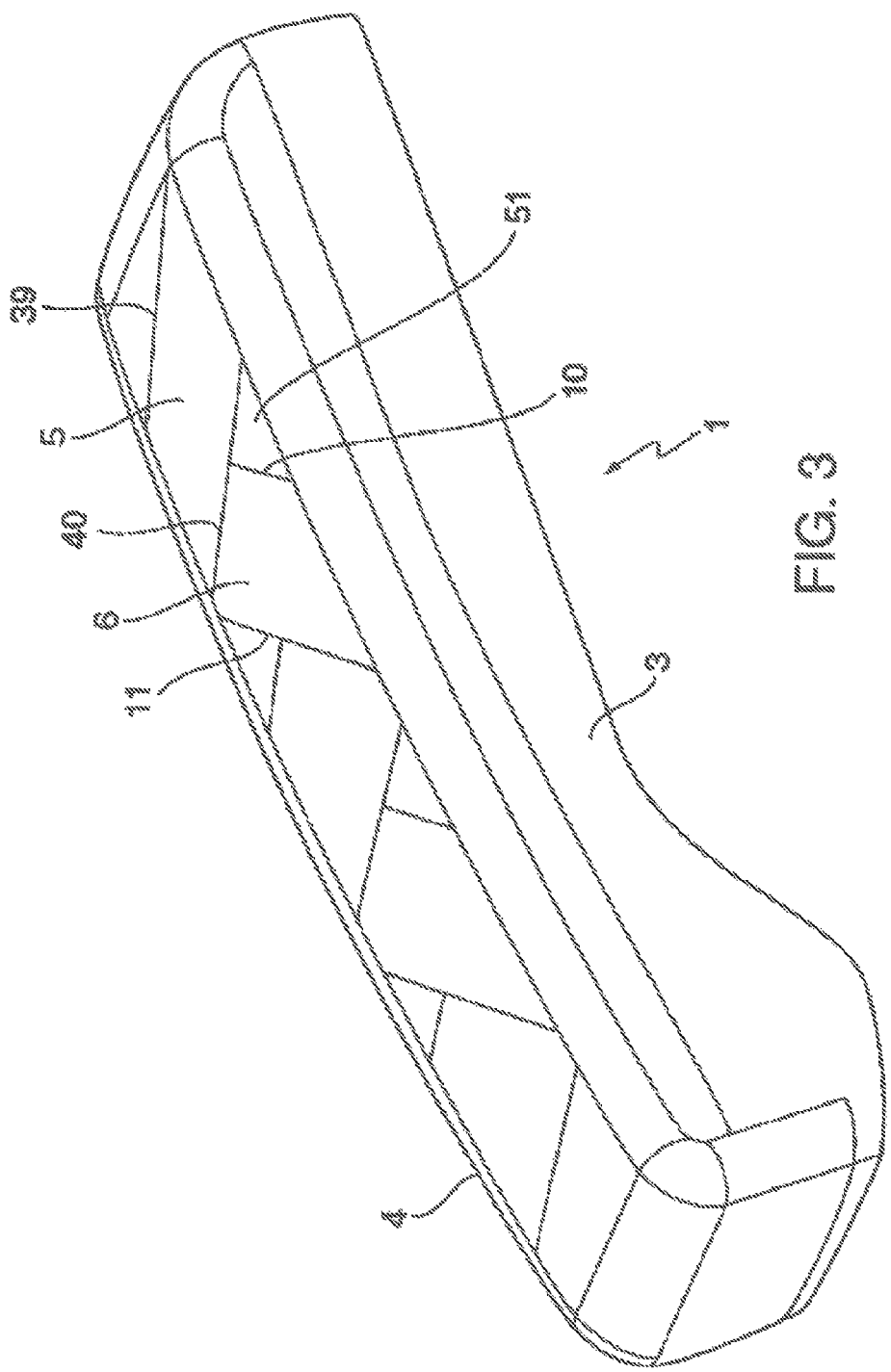
FIG. 3 shows an armrest with an alternative configuration of discrete regions.

FIG. 3 shows a further alternative embodiment of the invention, where a first discrete region 5 is bounded by two diagonal lines of separation 39 and 40. The second discrete region 6 is however bounded by three diagonal lines of separation. It is bounded by the second diagonal line of separation 40 which also bounds the first discrete region 5, and also by third and fourth diagonal lines of separation 10 and 11. The remaining discrete regions are bounded by three diagonal lines of separation in the same way as the second discrete region 6. The continued areas, such as 51, between the discrete regions 5 and 6 are flat to further define the discrete regions and also to provide flat surfaces for conventional armrest use by a single user. Preferably, the discrete regions may be oppositely slopped.

Figure 4:
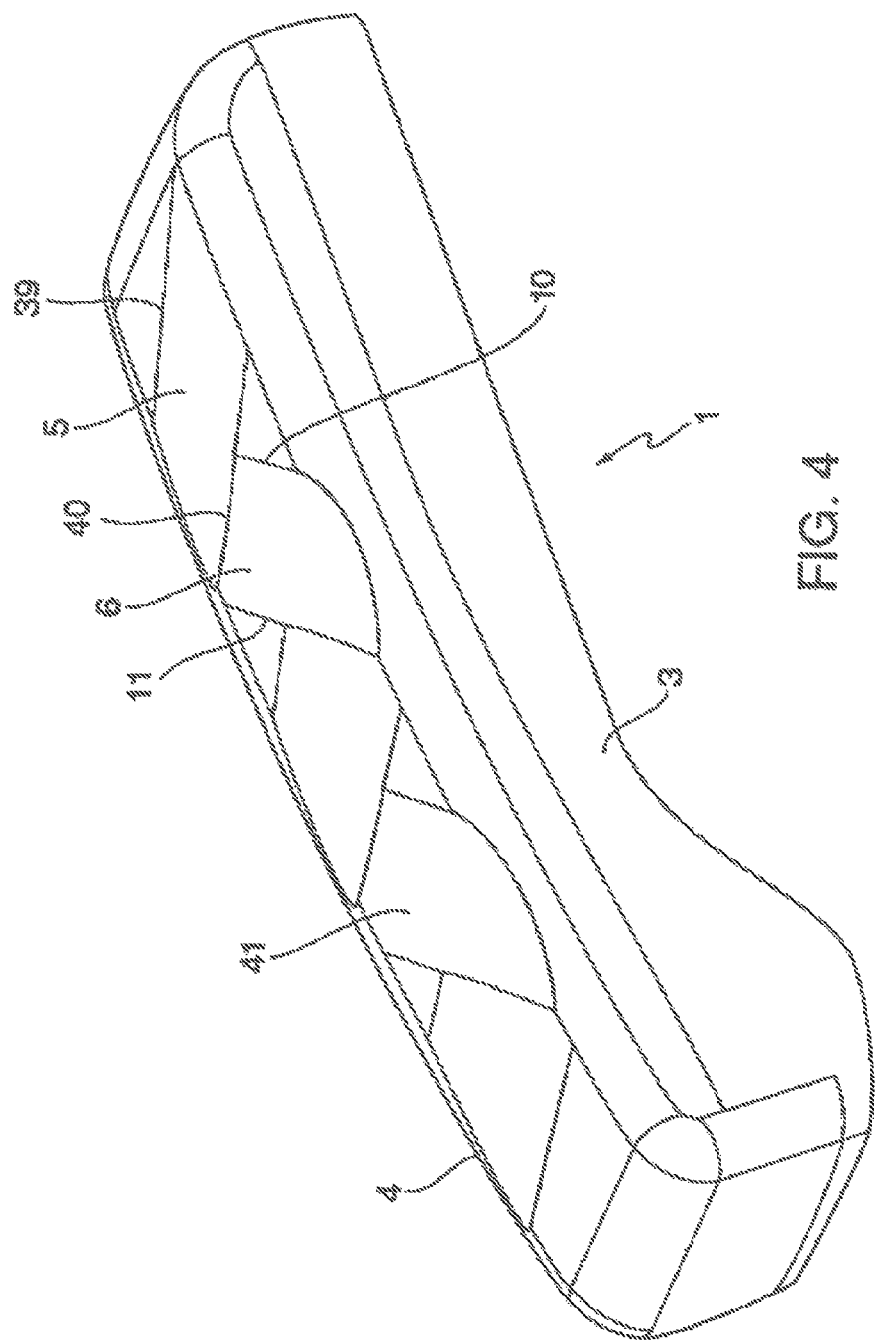
FIG. 4 shows an armrest with discrete regions that are sloping downwards towards the user.

FIG. 4 shows a preferred embodiment of the invention as shown in FIG. 3, with an additional feature where the discrete regions, such as 5 and 6, slope downwards towards their respective users. Discrete region 5 slopes downwards towards the second side surface 4 of the armrest 1. Discrete regions 6 and 41 slope downwards towards the first side surface 3 of the armrest. This configuration allows the users to rest their forearms in a natural position on the armrest 1 whilst deterring the user sitting opposite from using the wrong discrete region, as this would create an unnatural resting position.

Preferably, the sloped regions are also concave to further improve the comfort of a user.

Figure 5:
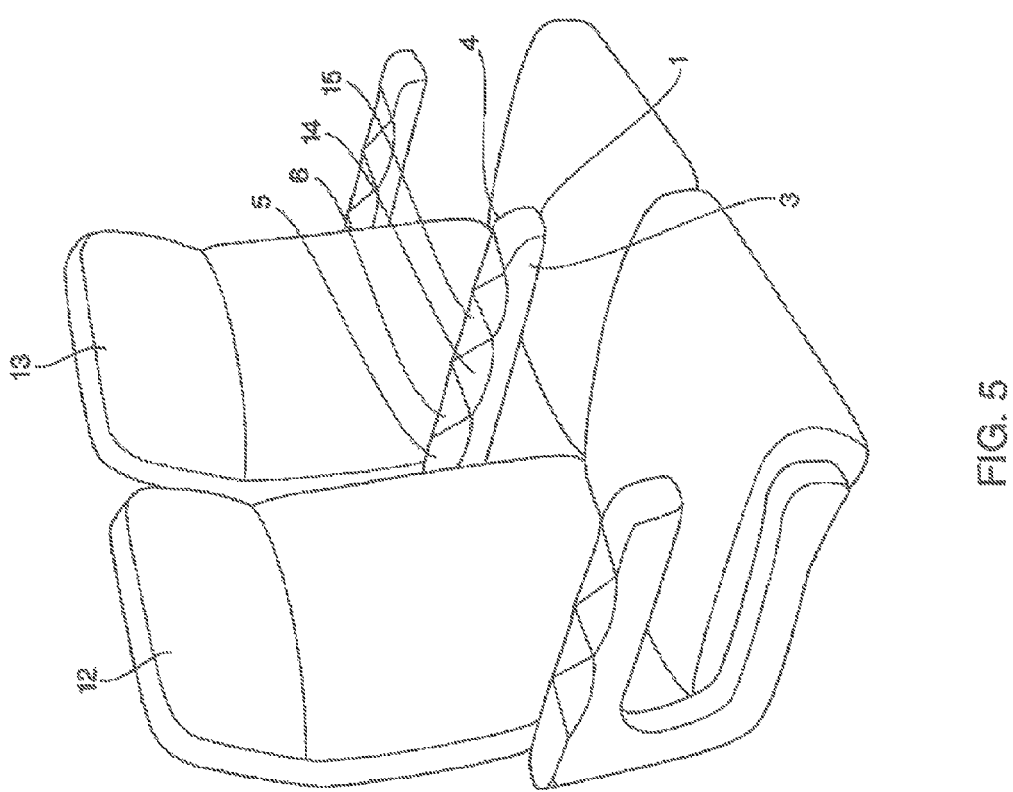
FIG. 5 shows armrests between adjacent seats, incorporating discrete regions that are sloped downwards.

FIG. 5 shows an armrest 1, between adjacent seats 12 and 13, incorporating a number of discrete regions such as 5, 6, 14 and 15. The discrete regions, such as 5 and 14, meant for resting on by a user sitting to the right of the armrest 1 in seat 12, slope downwards towards the first side surface 3 of the armrest 1. The discrete regions, such as 6 and 15, meant for resting on by a user sitting to the left of the armrest 1 in seat 13, slope downwards towards the second side surface 4 of the armrest.

The first discrete region 5 and the second side surface 4 form an edge which incorporates an angle, whilst the first discrete region 5 and the first side surface 3 form an edge which is rounded or relatively smooth or square. The second discrete region 6 and the first side surface 3 form an edge which incorporates an angle, whilst the second discrete region 6 and the second side surface 4 form an edge which is rounded or relatively smooth or square. This further enhances the natural resting position when a user sitting in seat 12 uses discrete regions such as 5 on the armrest 1, whilst the same discrete region 5 would be uncomfortable for a user sitting adjacently in seat 13.

Figure 6:
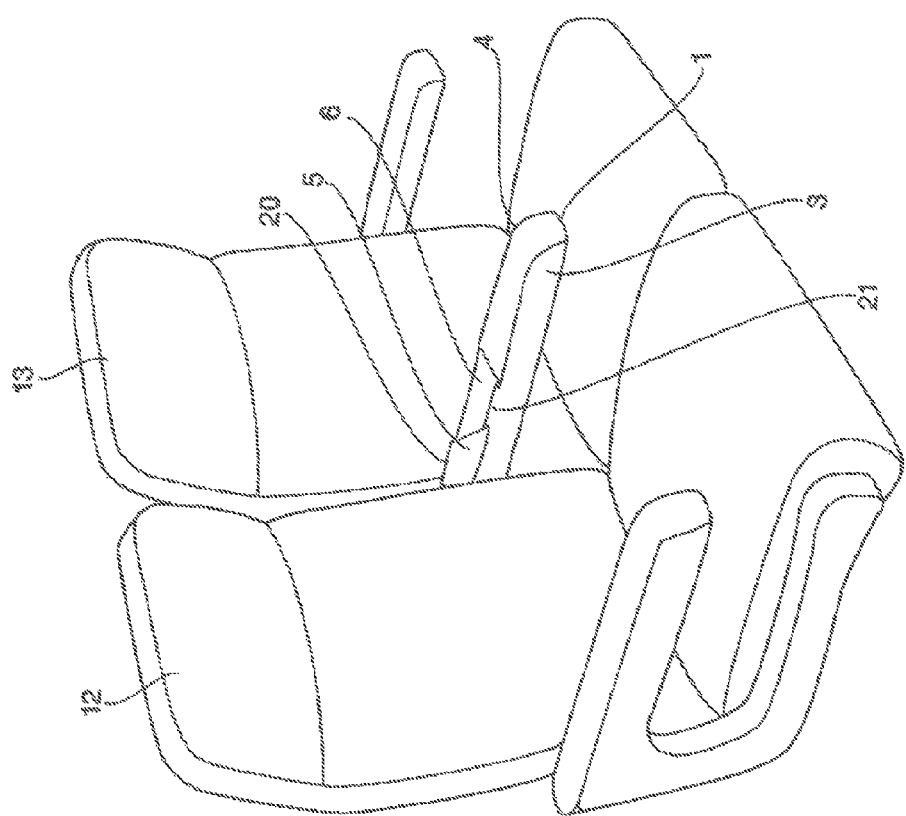
FIG. 6 shows an armrest between two adjacent seats, with discrete regions that incorporate an upward protrusion on its side surfaces.

Shown in FIG. 6, to even further enhance the natural resting positions, the first discrete region 5 and the second side surface 4 form an edge which incorporates an upward protrusion 20. Similarly, the second discrete region 6 and the first side surface 3 form an edge which incorporates an upward protrusion 21. This further deters a user sitting in seat 13 from placing their forearm in discrete region 5, or any other discrete regions intended for a user sitting in seat 12, and vice versa.

Figure 7:
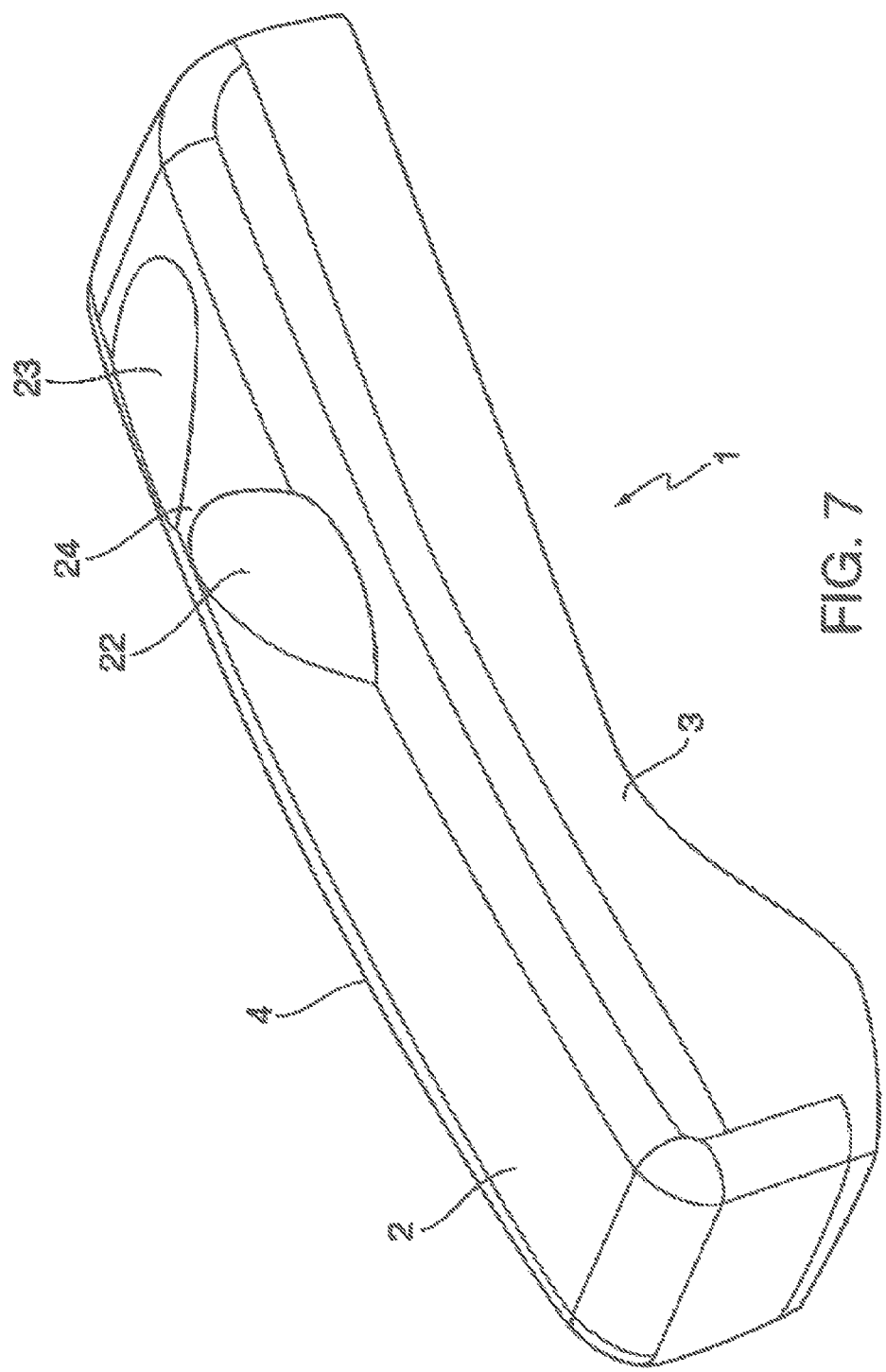
FIG. 7 shows an alternative configuration of discrete regions on an armrest that maybe slope downwards, concave or concave and angled.

FIG. 7 shows an alternative embodiment of the invention. The armrest 1 comprises a top surface 2, a first side surface 3 and a second side surface 4. The top surface 2 incorporates a number of discrete regions 22 and 23 which are bounded by curved diagonal lines. The elbow of a first user sitting adjacent the first side surface 3 of the armrest 1 rests on discrete region 22. The elbow of a second user sitting adjacent the second side surface 4 of the armrest 1 rests on discrete region 23. The first and second discrete regions 22 and 23 are separated by a line of separation 24. In this embodiment, more than two discrete regions may be present on the top surface 2 of the armrest 1 to allow multiple positions for each user to rest their elbow. Each of the discrete regions 22 and 23 slopes downwards towards their respective users in order to improve the natural resting position on the armrest 1. The discrete regions may be concave or concave and angled in order to provide optimum ergonomic comfort to the users.

Figure 8:
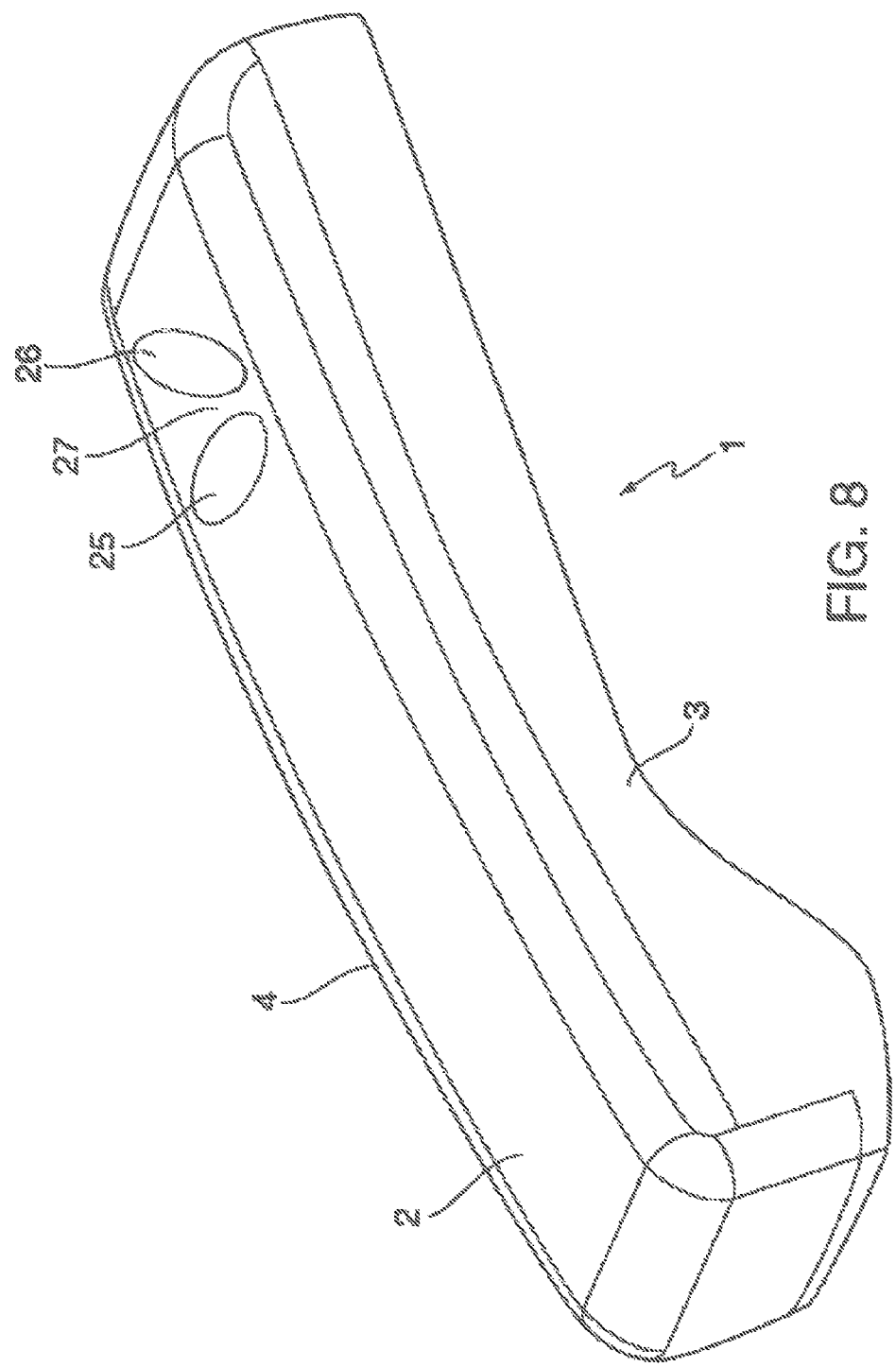
FIG. 8 shows a further alternative configuration of discrete regions on an armrest.

FIG. 8 shows a further alternative embodiment of the invention. Each of the discrete regions 25 and 26 are separated by a line of separation 27 and extend diagonally towards the side surface where the appropriate user is sitting. Discrete region 25 extends diagonally towards the second side surface 4, which is adjacent a user that will rest their left elbow in the appropriate discrete region 25. Discrete region 26 extends diagonally towards the first side surface 3, which is adjacent a user that will rest their right elbow in the appropriate discrete region 26. It is recognised that more than two discrete regions may be situated along the top surface 2 of the armrest 1 to provide multiple resting positions to each user.

The discrete regions 25 and 26 may be defined by particular textures or colours compared to the rest of the top surface 2 of the armrest 1. The discrete regions 25 and 26 may also be defined by being concave to allow the users elbows to sit comfortably within the regions.

Figure 9:
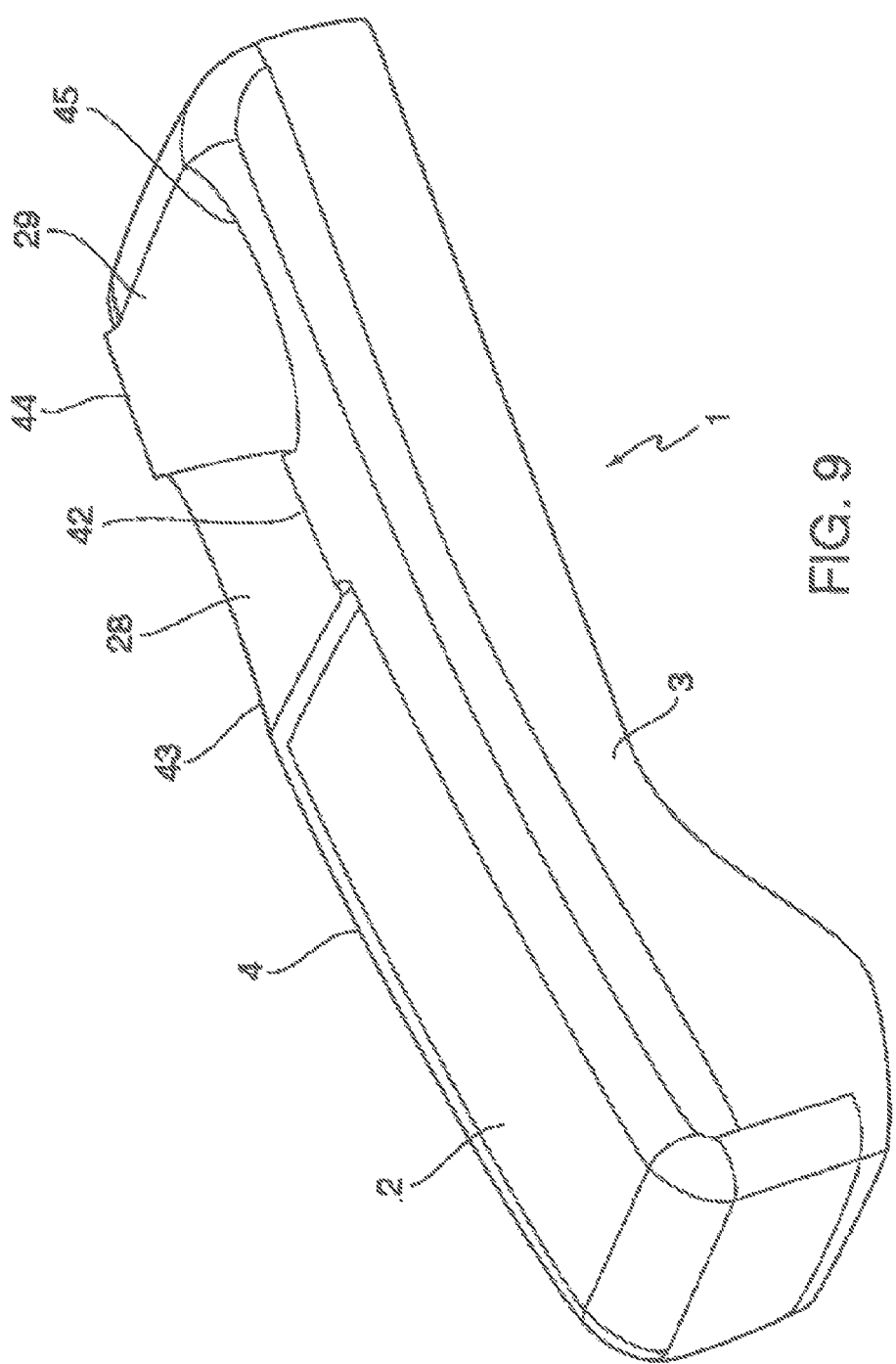
FIG. 9 shows discrete regions on an armrest that are wedge-shaped in cross section.

FIG. 9 shows a further alternative embodiment of the invention, where first and second discrete regions 28 and 29 are wedge-shaped in cross section. The first discrete region 28 and first side surface 3 of the armrest 1 form an edge which could incorporate an upward protrusion 42. The first discrete region 28 slopes downwards towards the second side surface 4 of the armrest 1 and forms an edge which is rounded or relatively smooth or square 43. The second discrete region 29 and second side surface 4 of the armrest 1 form an edge which incorporates an upward protrusion 44. The second discrete region 29 slopes downwards towards the first side surface 3 of the armrest 1 and forms an edge which is rounded or relatively smooth or square 45. This configuration provides a natural resting position for each user sitting adjacent the armrest 1 whilst deterring the use of a discrete region which forms an upward protrusion with the side surface closest to the user. This configuration also provides a comfortable resting position for a single user of the whole armrest 1 as each of the discrete regions 28 and 29 cradle the forearm of a single user due to their wedge-shaped cross section.

In an alternative embodiment the discrete regions of the armrest are separated by a trough. This configuration ensures that separation of the discrete regions does not involve a protrusion that would cause discomfort to either a single user or multiple users of an armrest.

Figure 10:
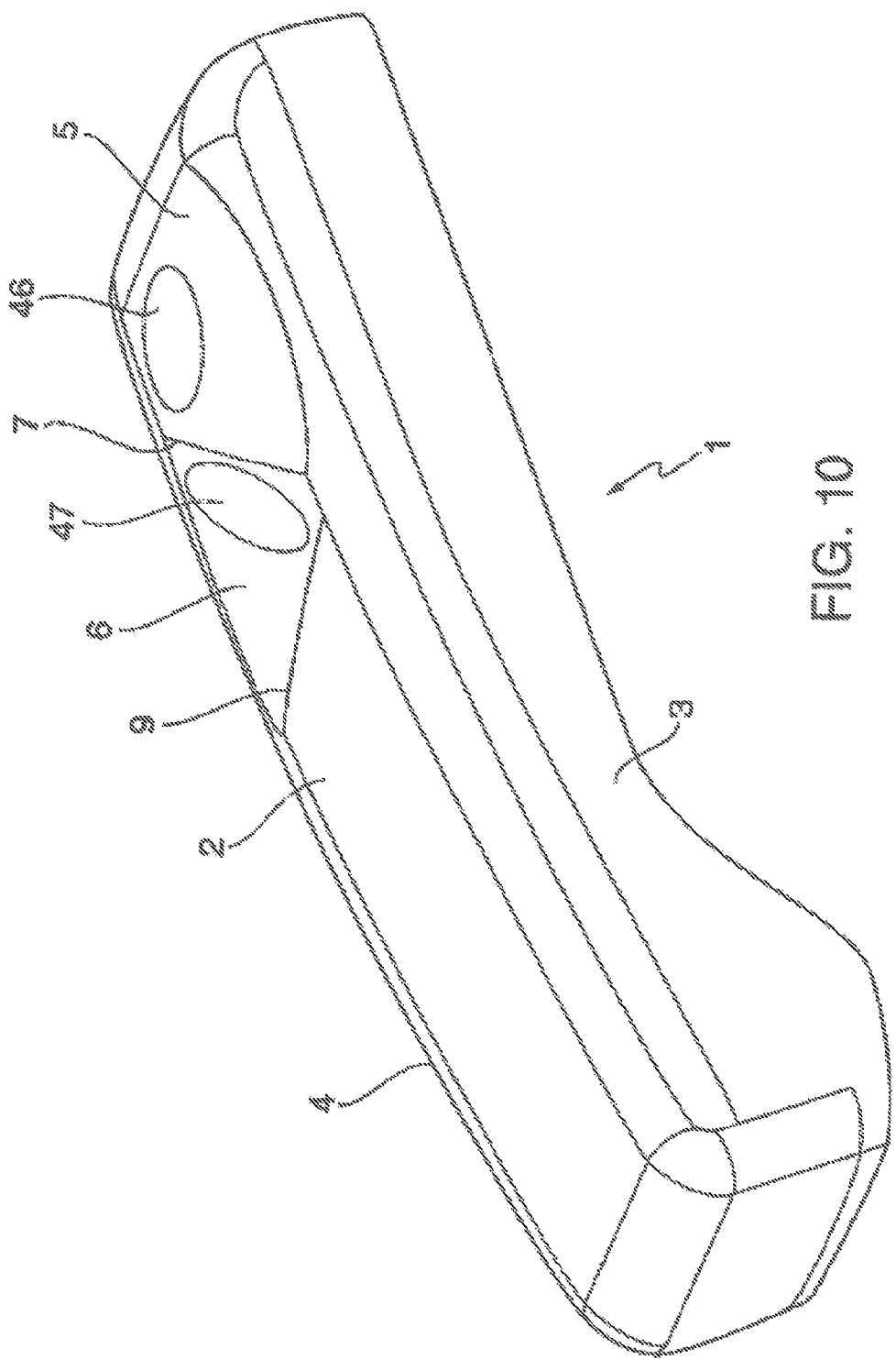
FIG. 10 shows a further alternative configuration incorporating discrete regions which are sloped downwards combined with further discrete regions on which a user can rest their elbow.

FIG. 10 shows a further alternative embodiment of the invention incorporating discrete regions 5 and 6 which are sloped downwards combined with further discrete regions 46 and 47 on which a user can rest their elbow. Regions 46 and 47 are particularly beneficial for guiding the gyration of the forearm whilst the elbow nestles in the cup-shaped region. This could be incorporated in any of the combinations.

Figure 11:
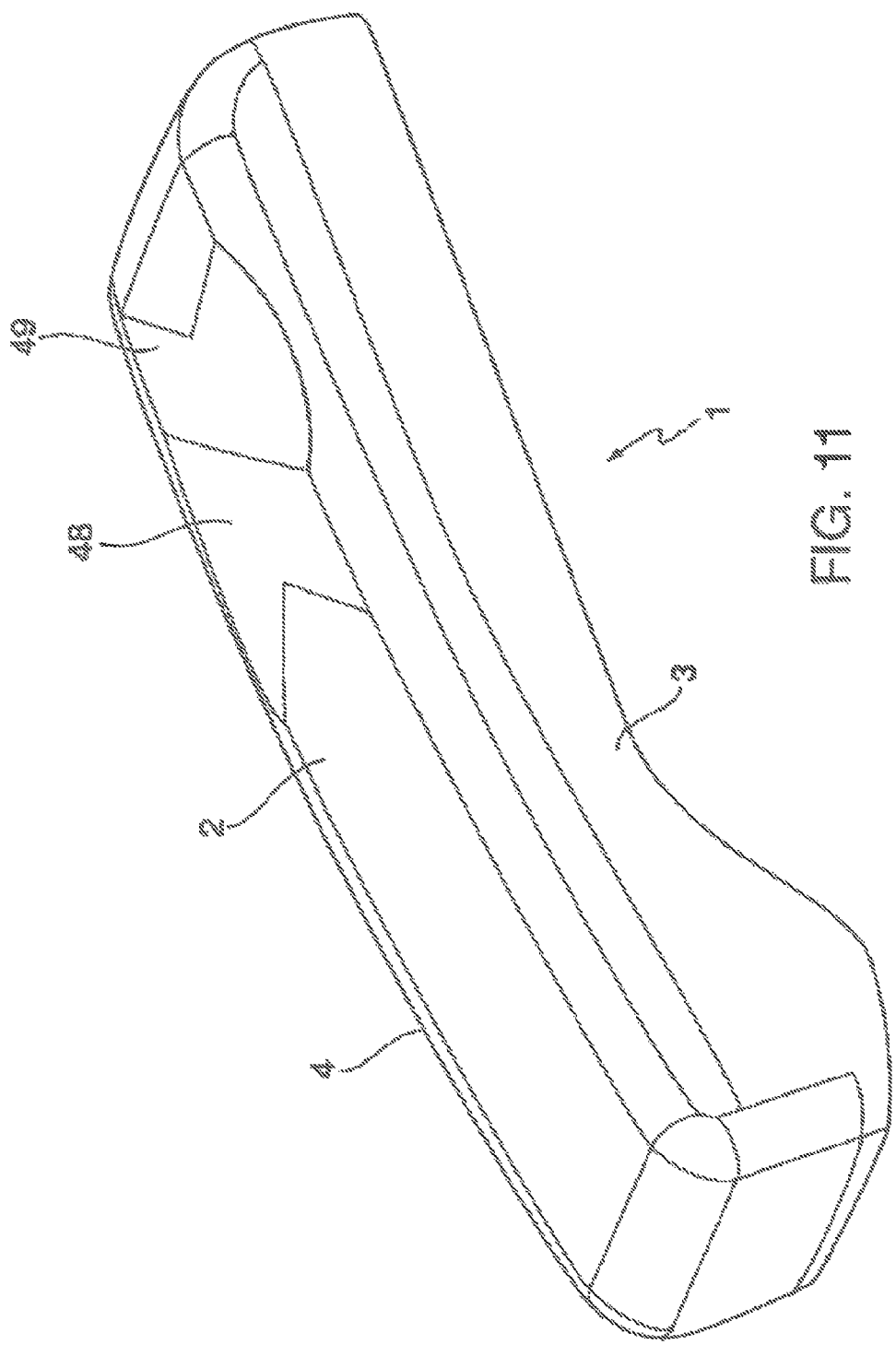
FIG. 11 shows a further alternative configuration of discrete regions on an armrest.

FIG. 11 shows an alternative embodiment of the invention consisting of discrete regions 48 and 49 which are located on the top surface 2 of an armrest 1. The alternative configuration of discrete regions 48 and 4 allow multiple resting positions to each user sitting adjacent the armrest 1.

Figure 12:
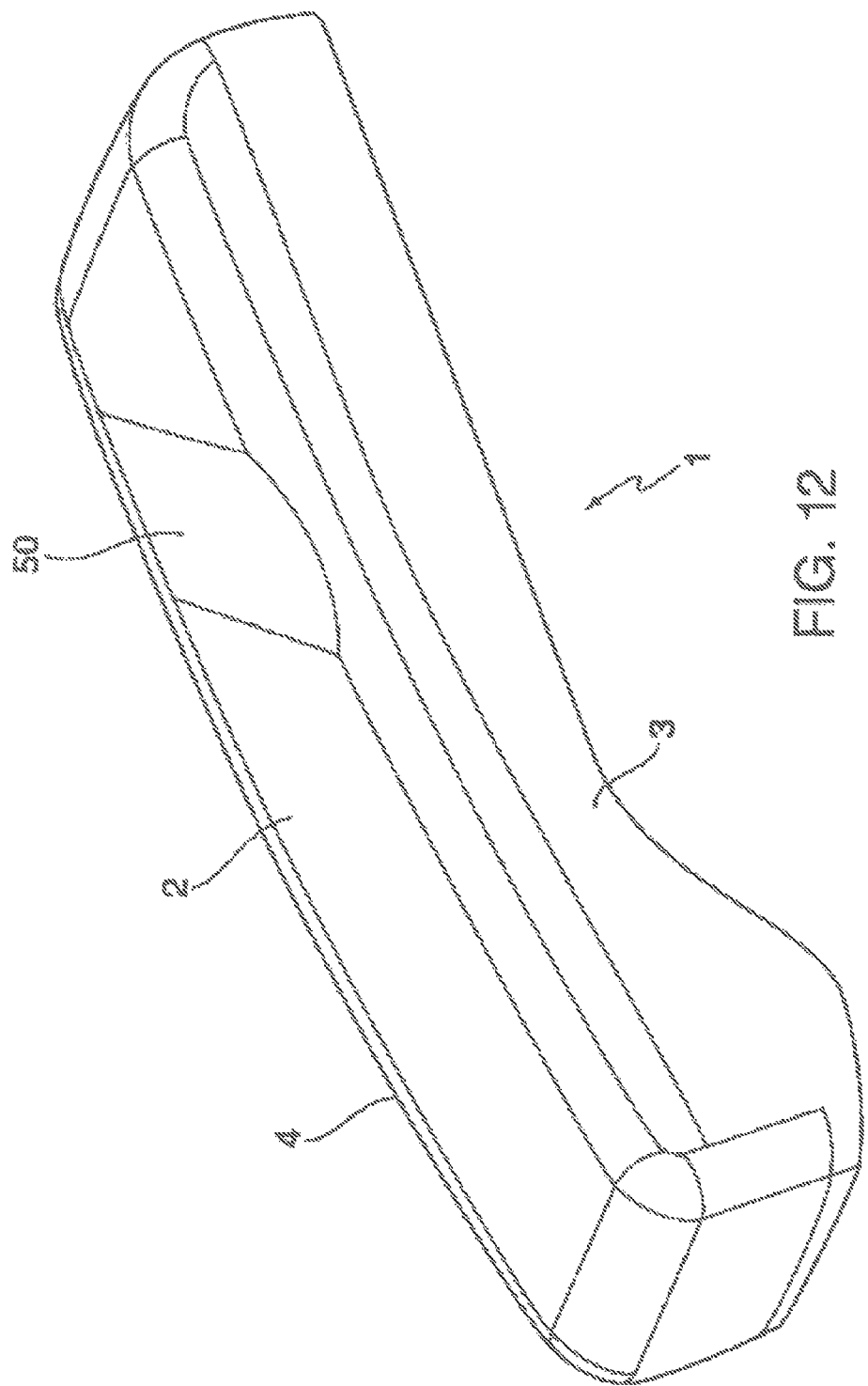
FIG. 12 shows an armrest incorporating a discrete region for a single user.

FIG. 12 shows an armrest 1 incorporating a discrete region 50 for a single user. An armrest 1 in which a single discrete region 50 can be utilised where two users are not sitting either side of the armrest 1 or where there is sufficient room for adjacent seats to have their own armrest. For instance, an armrest 1 with a single discrete region 50 can be utilised on both the window and aisle seats of an aeroplane where multiple discrete regions for two users are not required. This configuration provides a single user with a natural resting position for their forearm or elbow. The discrete region 50 is sloped downwards towards side surface 3, adjacent the seated user, to provide an improved natural resting position for the user's forearm or elbow. However, it is understood that the discrete region 50 can be flat or be configured in accordance with one of the other embodiments described.

Figure 16:
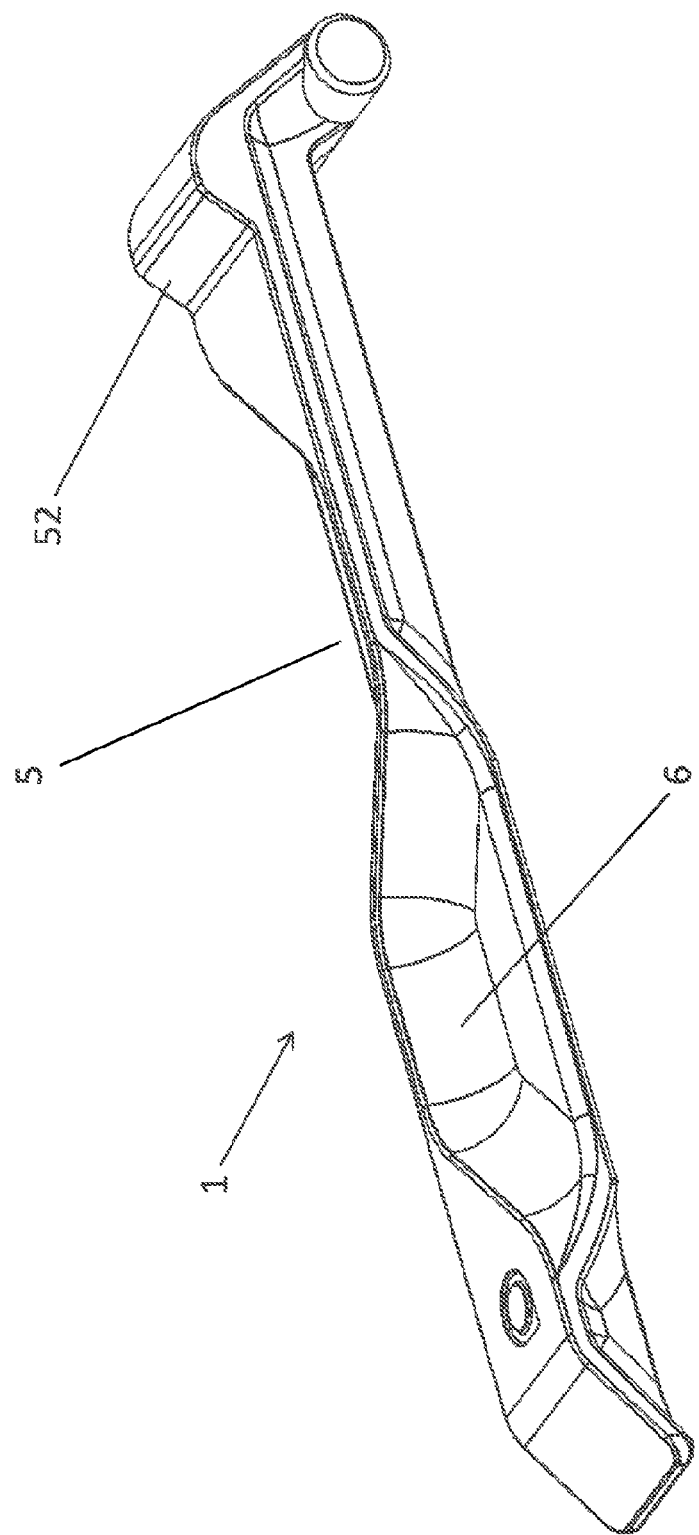
FIG. 16 shows a perspective view of an armrest with an incline towards the rear of the armrest.
Figure 17:
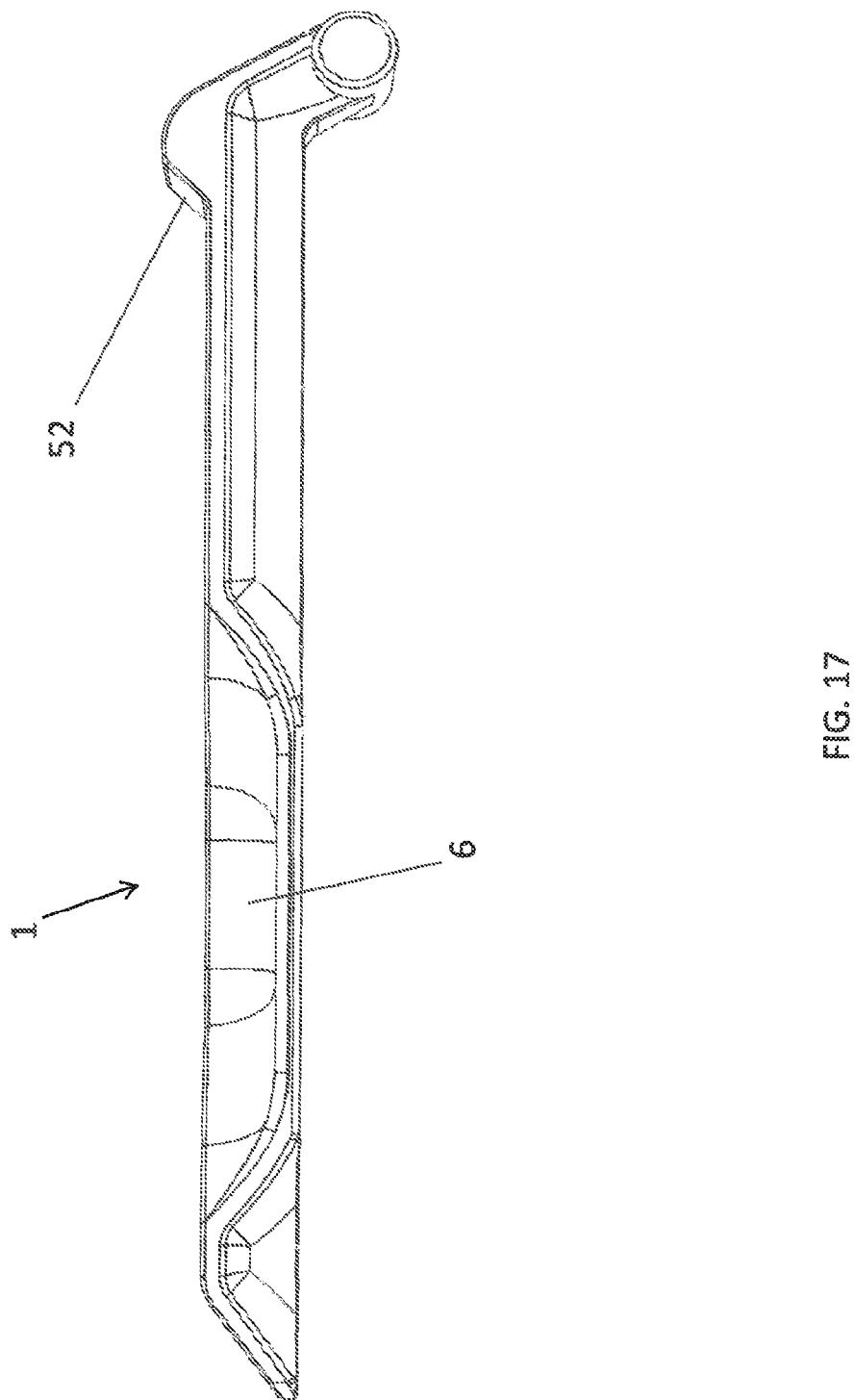
FIG. 17 shows a view from the side of the embodiment shown in FIG. 16.

In a further alternative embodiment, shown in FIG. 16, the armrest 1 further incorporates an inclined section 52 at its rear. This prevents a user's arm from falling down the back of the armrest and provides a further surface on which they can rest their arm against. This provides an additional elbow support, a support a user can rest their arm against and a barrier for preventing a user's arm from going back beyond the rear of the armrest. This embodiment is further illustrated in FIG. 17 which shows the inclined section 52 at the rear of the armrest 1. It is envisaged that the angle of incline of this section 52 could be an angle between 0° and 90° and may be concave or flat. In a further alternative embodiment, the armrest 1 incorporates a concave section (not shown) at its rear rather than an inclined section.

Figure 18:
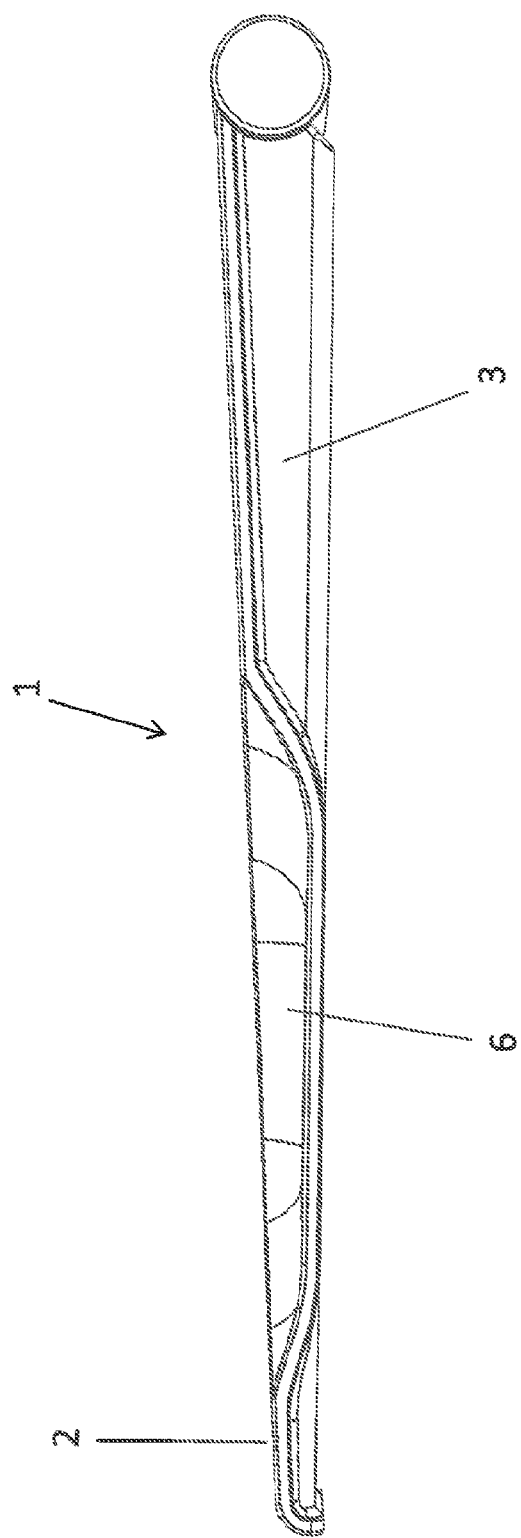
FIG. 18 shows a side view of a further embodiment of the invention with a tapered configuration.

In a further alternative embodiment, shown in FIG. 18, the armrest 1 has a tapered configuration such that the height of the armrest 1 at its rear is higher than the height at its front. This configuration further increases the amount of personal space available to users sitting adjacent the armrest as further space is provided above and below the armrest. This is especially advantageous in confined spaces such as an aeroplane cabin where providing the maximum amount of space to a passenger is of the utmost importance. An overhanging lip may be provided about at least part of the perimeter of the armrest.

Where the armrest has a tapered configuration, if the upper surface is inclined, the bottom surface may be flat or angled and vice versa. The upper and tower surfaces may be level, or angled upwards towards the front or angled downwards towards the front.

Figure 19:
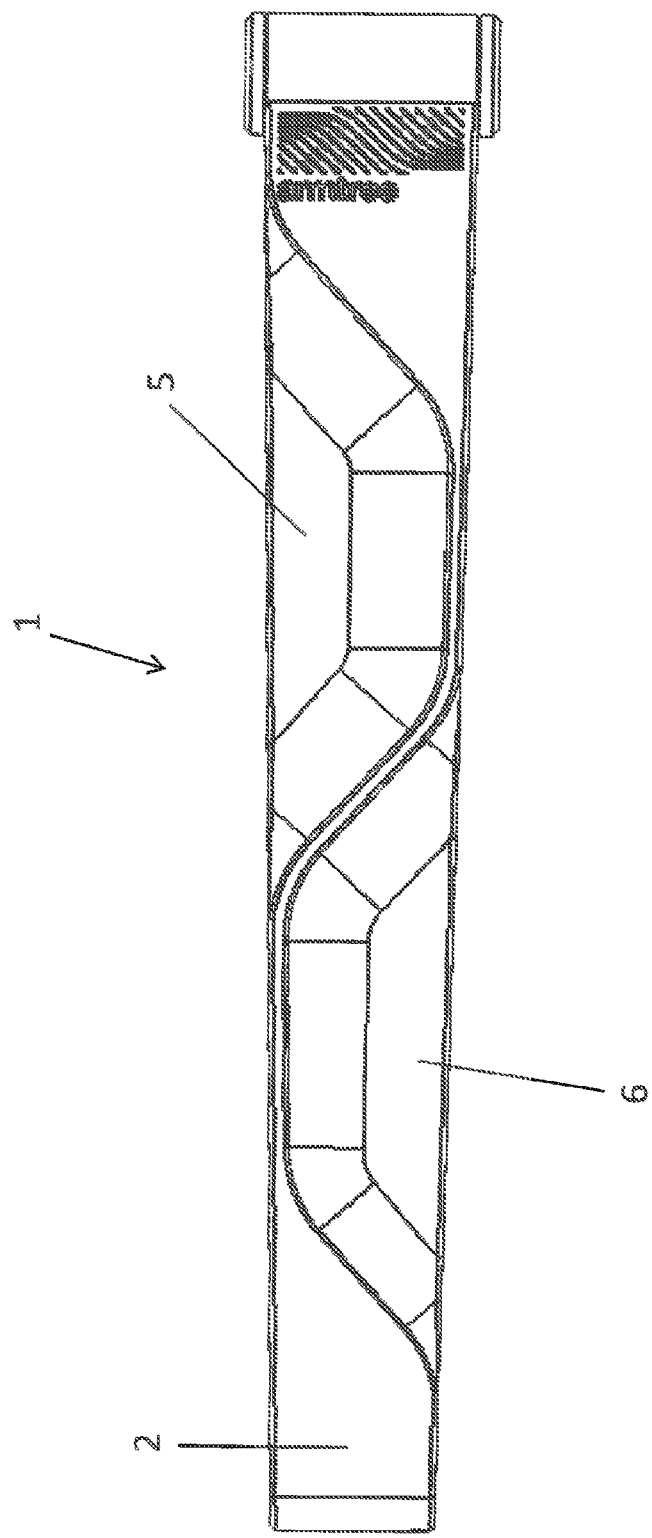
FIG. 19 shows a plan view of an armrest in accordance with the embodiment of FIG. 18.

It is also envisaged in another alternative embodiment, shown in FIG. 19, that the width of the armrest tapers towards the front in order to further increase the amount of space available to a user. Alternatively the armrest is tapered towards the rear.

Figure 20:
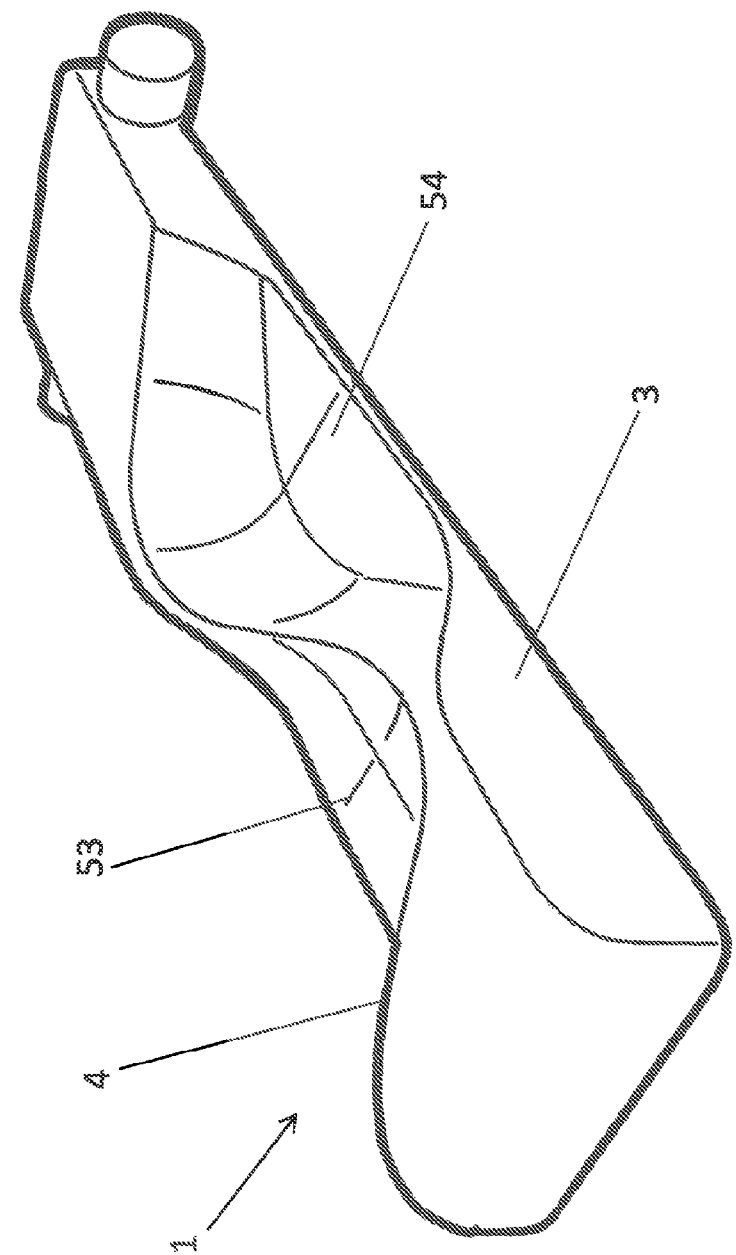
FIG. 20 shows a perspective view of another embodiment of the invention which is of a smaller size than previous embodiments.
Figure 21:
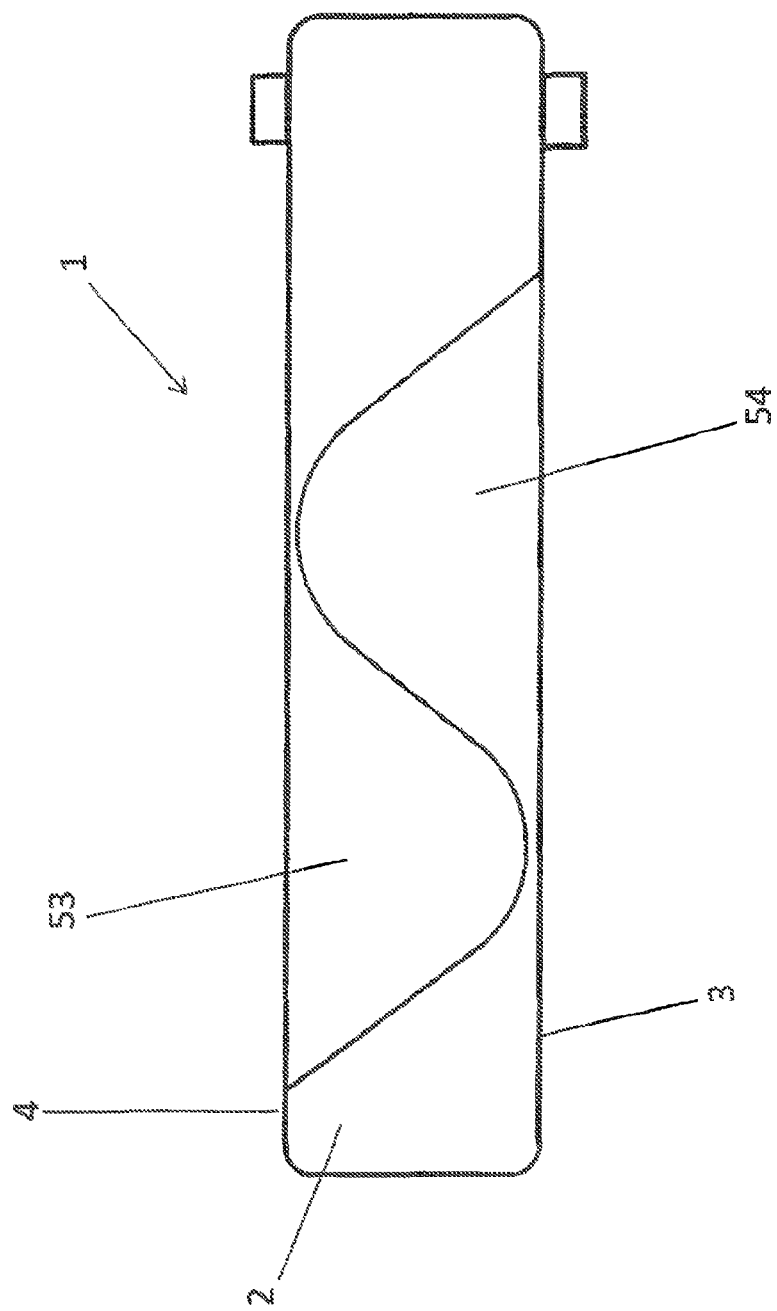
FIG. 21 shows a plan view of the embodiment of FIG. 20.

In a further alternative embodiment, shown in FIGS. 20 and 21, a 'short' version of the armrest 1 is provided. In this embodiment the length of the armrest is substantially shorter than is provided in previous embodiments. This configuration provides further space to users sitting adjacent the armrest 1. In this embodiment at least one discrete region 53, 54 is provided for each user sitting adjacent the armrest 1. The discrete regions 53, 54 in this instance may be more angular in order to provide sufficient space for each user on a shorter armrest. As in previous embodiments, each of the discrete regions 53, 54 slopes downwards towards their respective side walls 3, 4.

Although the discrete regions of the 'short' version of the armrest may be smaller in size and area, they may be comprised of any of the shapes from any of the previous and alternative embodiments outlined.

In another alternative embodiment which is not shown in the figures, the discrete regions of the armrest 1 span from one side watt 3 to the other side wall 4, with the line of separation being positioned between the two discrete regions.

In each embodiment of the invention, the armrest 1 may also be substantially cushioned to provide further comfort to either a single or multiple users of the armrest 1.

In each embodiment of the invention, the discrete regions incorporated on the top surface 2 of the armrest 1 can be defined using defining textures, colours or materials. The discrete regions may also be either flat or defined concave when the remainder of the top surface 2 of the armrest 1 is flat.

The armrest can be equipped to house existing components such as seat recline buttons and audio/visual or attendant call controls. The current invention can also be retrofitted to existing armrest units.

In a further alternative embodiment, the armrest 1 comprises a hinge mechanism at a position along one of the side walls, or the front or the back of the armrest, in order for the armrest to accessibly hold components, such as a tray table, lighting, signage, heating, motor mechanisms or storage. When the contents of the armrest are to be accessed, a section of the armrest can be pivoted away from the remainder of the armrest to expose the contents.

In accordance with existing armrests, the current invention can be retracted and/or pivoted to fit flushly between seat backs.

In an alternative embodiment, the armrest 1 consists of a single piece of material which is moulded/bent to form any of the configurations (or a combination thereof) of the preceding embodiments. Preferably, the material is of a metallic and/or plastic material. In yet another alternative embodiment, the single piece of material may be manipulated in such a way as to create a helical or spiral configuration with discrete regions for adjacent users.

In a further alternative embodiment of the invention, a discrete region or regions are arranged on the top surface of a wider than normal armrest. The current invention encompasses in certain embodiments armrests of any length or width.

Figure 22:
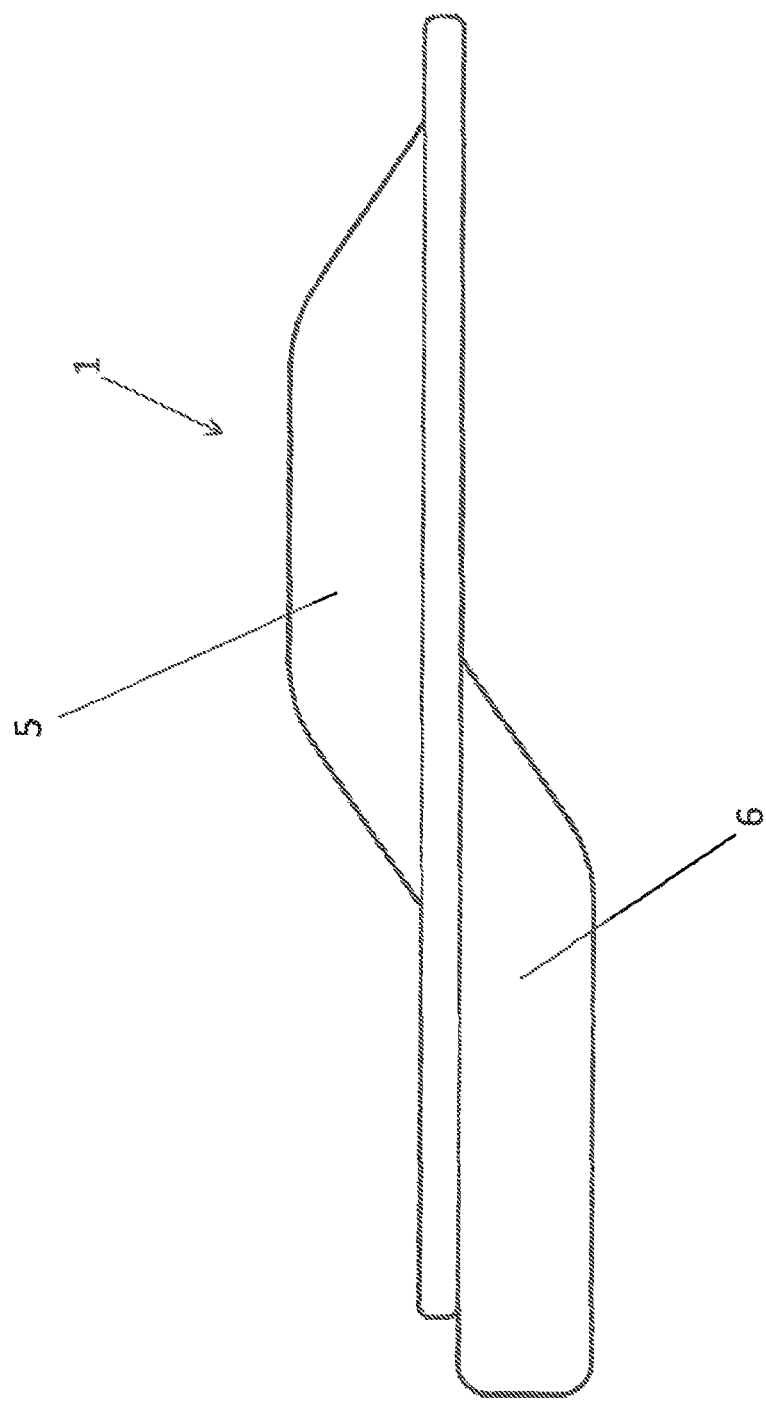
FIG. 22 shows a plan view of another embodiment of the invention with a central spine.

FIG. 22 shows an alternative embodiment wherein the armrest has a central spine and a first discrete region extending from the right hand side of the spine and a second discrete region extending from the left hand side of the spine. The discrete regions are staggered, with the second discrete region positioned further forward than the first discrete region, to increase the amount of personal space available to users positioned either side of the armrest.

FIG. 23a shows another alternative embodiment wherein the top surface of the armrest incorporates a central protruding spine to define a discrete region on either side of the armrest. Towards the front of the armrest the spine tapers and flattens in order to allow a user to place their elbow at the front of the armrest whilst leaning forwards, FIG. 23b shows a cross sectional view of the armrest shown in FIG. 23a with the central protruding spine separating the discrete regions of the armrest.

Figure 24:
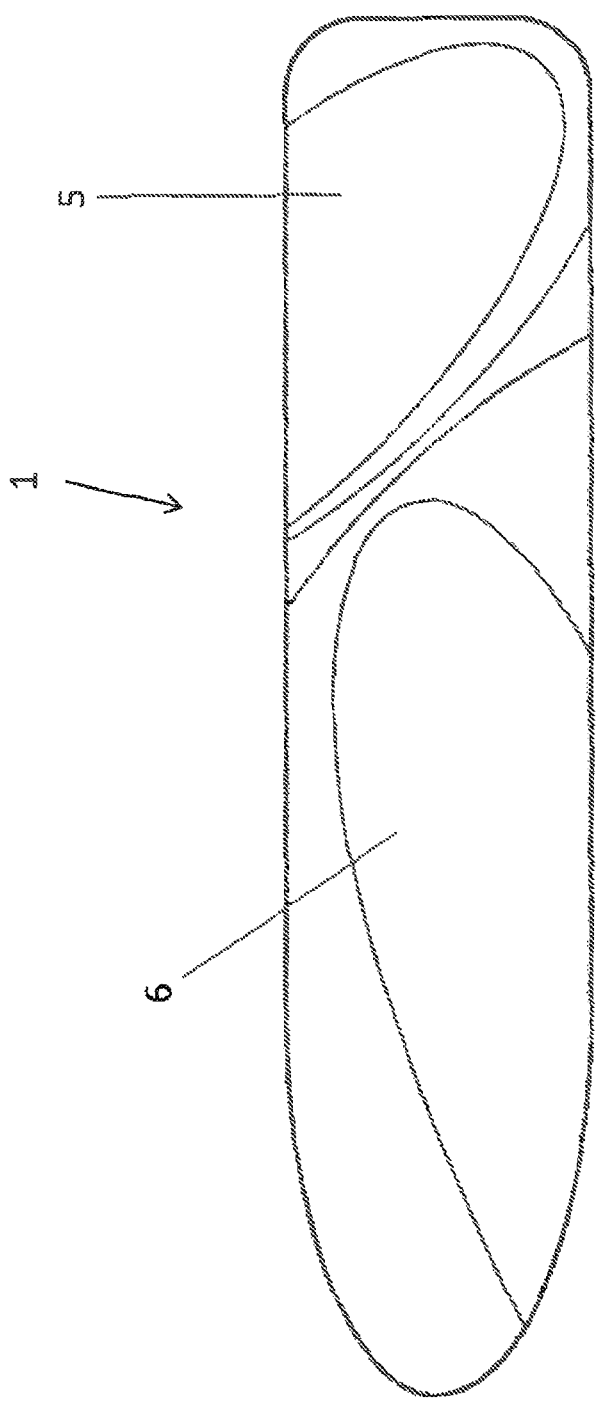
FIG. 24 shows a plan view of a further embodiment of the invention.

FIG. 24 shows another alternative embodiment wherein two discrete regions of the armrest are recessed and concave to provide a resting position for adjacent users. The concave configuration of the armrest provides a comfortable resting position for either two adjacent users or a single user utilising the whole armrest. The front of the armrest is rounded.

Figure 13:
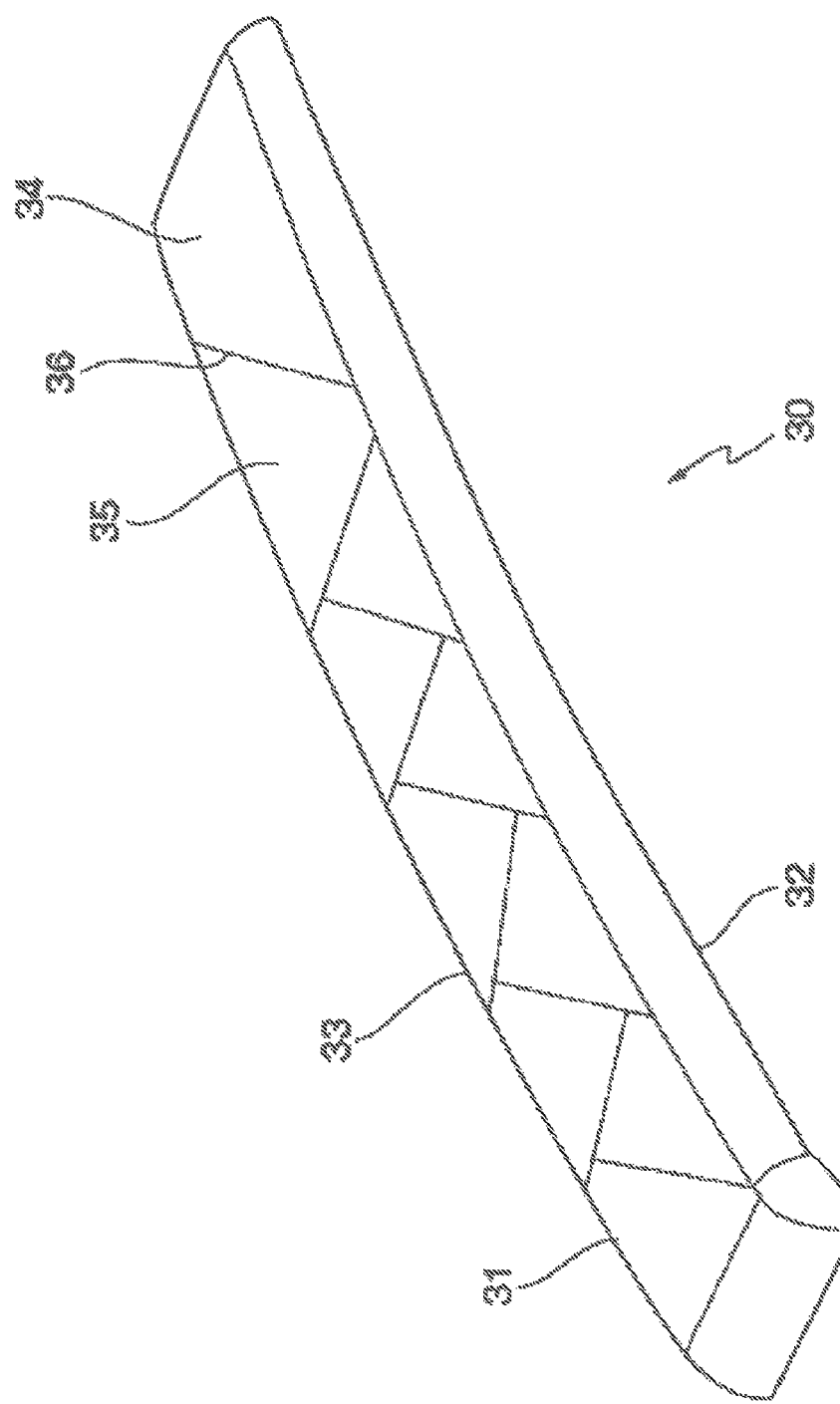
FIG. 13 shows a pad, incorporating a number of discrete regions, suitable for securing onto the top surface of an armrest which could incorporate any of the variants in a single user configuration.

FIG. 13 shows an armrest pad 30 suitable for securing onto an armrest, which may incorporate any of the features disclosed in FIGS. 1 to 12 and 14 to 24. The pad 30 comprises a top surface 31, a first side surface 32 and a second side surface 33. The top surface of the pad 31 incorporates a number of discrete regions, such as 34 and 35. A first discrete region 34 extends diagonally towards the first side surface 32 of the armrest pad 30. At least one other discrete region, such as 35, is located in front of the first discrete region 34 and extends diagonally towards the second side surface 33 of the armrest pad 30. This configuration provides a number of discrete regions for users sitting in adjacent seats to rest their elbows or forearms in a comfortable manner. The first and second discrete regions 34 and 35 are separated by a line of separation 36. This line does not protrude higher than the majority of the top surface 31 of the armrest pad 30.

The armrest pad 30 is suitable for securing to an armrest by adhesive means such as by screwing, gluing or other means known in the art. The armrest pad 30 can be used to replace an existing armrest pad where required.

In one embodiment, the armrest pad 30 and/or whole armrest can be substantially cushioned to provide further comfort to either a single or multiple users of the armrest pad.

It is recognised that there may be fewer discrete regions arranged on the armrest pad 30 than illustrated in FIG. 13, or that the discrete regions may be provided in an arrangement similar to the arrangements illustrated in FIGS. 1 to 12 and 14 to 24.

In any one of the embodiments, the discrete regions may be differentiated by an appropriate use of colours/textures.

The invention claimed is:

1. An armrest comprising a top surface; a first side surface and a second side surface being opposite to said first side surface; wherein said top surface incorporates a number of discrete regions; a first discrete region on which, in use, an elbow of a first user rests; said first discrete region extending diagonally towards said first side surface; and at least one further discrete region located in front of said first discrete region which extends diagonally towards said second side surface; whereby said second discrete region provides, in use, a resting surface for an elbow of a second user seating in an adjacent seat; characterized in that said first region is bounded by a first diagonal line of separation located between said first and second region; and said second region is bounded by said first diagonal line of separation and a further diagonal line of separation extending in the opposite direction to said first line; wherein said first discrete region and said second side surface form an edge which incorporates an upward protrusion; and wherein said second discrete region and said first side surface form an edge which incorporates an upward protrusion.

2. The armrest according to claim 1, wherein both said first and second regions slope oppositely from one another down towards respective side surfaces.

3. The armrest according to claim 1, wherein the armrest comprises front and rear ends and has a tapered configuration, such that the height of the armrest at its rear is higher than the height at its front.

4. The armrest according to claim 1, wherein the armrest comprises front and rear ends and the width of the armrest tapers towards the front.

5. The armrest according to claim 1, wherein said first discrete region and said second side surface form an edge which incorporates an angle whilst said first discrete region and said first side surface form an edge which is rounded or relatively smooth or square.

6. The armrest according to claim 1, wherein said second discrete region and said first side surface form an edge which incorporates an angle whilst said second discrete region and said second side surface form an edge which is rounded or relatively smooth or square.

7. The armrest according to claim 1, wherein said discrete regions are wedge shaped in cross-section.

8. The armrest according to claim 1, wherein said discrete regions are separated by a trough.

9. The armrest according to claim 1, wherein said discrete regions are concave or partly concave.

10. An armrest pad comprising a top surface; a first side surface, a second side surface and a bottom surface for securing onto the top surface of an armrest; said second side surface being opposite to said first side surface; wherein said armrest pad's top surface incorporates a number of discrete regions; a first discrete region on which, in use, an elbow of a first user rests; said first discrete region extending diagonally towards said first side surface; and at least one further discrete region located in front of said first discrete region which extends diagonally towards said second side surface; whereby said second discrete region provides, in use, a resting surface for an elbow of a second user seating in an adjacent seat; characterized in that said first region is bounded by a first diagonal line of separation located between said first and second region; and said second region is bounded by said first diagonal line of separation and a further diagonal line of separation extending in the opposite direction to said first line; wherein said first discrete region and said second side surface form an edge which incorporates an upward protrusion; and wherein said second discrete region and said first side surface form an edge which incorporates an upward protrusion.

11. The armrest pad according to claim 10, wherein said discrete regions are wedge shaped in cross-section.

12. The armrest pad according to claim 10, wherein said discrete regions-are separated by a trough.

13. The armrest pad according to claim 10, wherein both said first and second regions slope oppositely from one another down towards respective side surfaces.

14. The armrest pad according to claim 10, wherein the armrest pad comprises front and rear ends and has a tapered configuration, such that the height of the armrest pad at its rear is higher than the height at its front.

15. The armrest pad according to claim 10, wherein the armrest pad comprises front and rear ends and the width of the armrest pad tapers towards the front.

16. The armrest pad according to claim 10, wherein said first discrete region and said second side surface form an edge which incorporates an angle whilst said first discrete region and said first side surface form an edge which is rounded or relatively smooth.

17. The armrest pad according to claim 10, wherein said second discrete region and said first side surface form an edge which incorporates an angle whilst said second discrete region and said second side surface form an edge which is rounded or relatively smooth.

18. The armrest pad according to claim 10, wherein said discrete regions are concave.

\* \* \* \* \*